United States Patent
Kawai et al.

(10) Patent No.: US 9,252,636 B2
(45) Date of Patent: Feb. 2, 2016

(54) ARMATURE, METHOD FOR WINDING COIL, AND DC MOTOR

(71) Applicant: ASMO CO., LTD., Shizuoka-ken (JP)

(72) Inventors: Keita Kawai, Toyohashi (JP); Tomohisa Okamoto, Kosai (JP); Takehiko Ohshita, Kosai (JP)

(73) Assignee: Asmo Co., Ltd., Shizuoka-Ken (JP)

( * ) Notice: Subject to any disclaimer, the term of this patent is extended or adjusted under 35 U.S.C. 154(b) by 368 days.

(21) Appl. No.: 13/931,053

(22) Filed: Jun. 28, 2013

(65) Prior Publication Data

US 2014/0009027 A1 Jan. 9, 2014

(30) Foreign Application Priority Data

Jul. 3, 2012 (JP) ................................ 2012-149578

(51) Int. Cl.
| | |
|---|---|
| *H02K 3/20* | (2006.01) |
| *H02K 3/28* | (2006.01) |
| *H02K 23/26* | (2006.01) |
| *H02K 3/00* | (2006.01) |
| *H02K 15/08* | (2006.01) |
| *H02K 1/24* | (2006.01) |

(52) U.S. Cl.
CPC .. *H02K 3/00* (2013.01); *H02K 1/24* (2013.01); *H02K 3/28* (2013.01); *H02K 15/08* (2013.01); *H02K 23/26* (2013.01); *Y10T 29/49011* (2015.01)

(58) Field of Classification Search
None
See application file for complete search history.

(56) References Cited

U.S. PATENT DOCUMENTS

| | | | | |
|---|---|---|---|---|
| 4,038,575 | A * | 7/1977 | Nordebo | H02K 19/24 310/179 |
| 4,591,766 | A * | 5/1986 | Takaba | H02K 29/12 310/216.095 |
| 4,935,653 | A * | 6/1990 | Cheng | H02K 1/165 310/184 |
| 8,013,491 | B2 * | 9/2011 | Krauth | H02K 1/165 310/84 |
| 8,350,437 | B2 | 1/2013 | Doushita et al. | |
| 2011/0050025 | A1 * | 3/2011 | Doushita | H02K 1/146 310/198 |

FOREIGN PATENT DOCUMENTS

JP 2011-055655 A 3/2011

* cited by examiner

*Primary Examiner* — Tran Nguyen
(74) *Attorney, Agent, or Firm* — Christensen Fonder P.A.

(57) ABSTRACT

A plurality of teeth of an armature core arranged in a circumferential direction each include an inner winding portion in its proximal region and first and second branch portions that extend radially and branch off in a bifurcated manner from a distal end of the inner winding portion in the circumferential direction. After winding the first to ninth coils around the inner winding portions of all of the teeth, the tenth to eighteenth coils are wound sequentially around outer winding portions of adjacent ones of the teeth each including the first branch portion of one of the two adjacent teeth and the second branch portion of the other one of the adjacent teeth.

6 Claims, 14 Drawing Sheets

ARMATURE, METHOD FOR WINDING COIL, AND DC MOTOR

BACKGROUND OF THE INVENTION

The present invention relates to an armature, a method for winding coils, and a DC motor.

Japanese Laid-Open Patent Publication No. 2011-55655 describes an armature of a DC motor including an armature core provided with a plurality of teeth arranged in a circumferential direction. Each tooth includes a distal region that bifurcates into a first branch portion and a second branch portion. A coil is wound by concentrated winding around a proximal region of each tooth, which is radially near the center of the armature core. Further, a coil is wound by distributed winding around a portion of two adjacent teeth including a first branch portion of one of the adjacent teeth and a second branch portion of the other one of the adjacent teeth. This allows the DC motor to decrease cogging.

A method is needed for winding coils of such an armature for a DC motor with three or more odd number of pole pairs, for example, a DC motor with six poles.

SUMMARY OF THE INVENTION

It is an object of the present disclosure to provide an armature, a method for winding coils, and a DC motor that allows for simple winding of a concentrated coil arranged radially near the center of the armature core and a distributed coil arranged radially outward in the armature core.

To achieve the above object, one aspect of a method for winding coils of an armature is disclosed. The armature includes an armature core provided with a plurality of teeth arranged in a circumferential direction. Each tooth includes an inner winding portion, which extends radially in a proximal region of the tooth, and first and second branch portions, which extend radially and branch off in a bifurcated manner from a distal end of the inner winding portion in the circumferential direction. A plurality of armature coils are wound around the teeth and include a plurality of concentrated coils and a plurality of distributed coils. A commutator includes a plurality of commutator pieces arranged in the circumferential direction. The commutator is integrally rotatable with the armature core. The method includes winding each of the concentrated coils around the inner winding portion of the teeth, and winding each of the distributed coils around an outer winding portion of two adjacent ones of the teeth after winding each concentrated coil. The outer winding portion includes the first branch portion of one of the adjacent teeth and the second branch portion of the other one of the adjacent teeth.

The above aspect allows for every one of the coils to be continuously wound.

In a further aspect of a method for winding coils of an armature in the present disclosure, the inner winding portions are divided into a plurality of groups with each group including a plurality of inner winding portions arranged at equal angular intervals, and the concentrated coils are simultaneously wound around the inner winding portions of the same group. The outer winding portions of the teeth are divided into a plurality of groups with each group including a plurality of outer winding portions arranged at equal angular intervals, and the distributed coils are simultaneously wound around the outer winding portions of the same group.

The above structure simultaneously winds a plurality of coils at a plurality of locations and thereby shortens the time required for the winding.

One aspect of an armature in the present disclosure is provided with an armature core including 3n (where n is an odd number greater than or equal to 3) teeth arranged in a circumferential direction. Each of the 3n teeth includes an inner winding portion, which extends radially in a proximal region of each of the corresponding tooth, and first and second branch portions, which extend radially and branch off in a bifurcated manner from a distal end of the inner winding portion in the circumferential direction. The armature is also provided with 6n armature coils including 3n concentrated coils and 3n distributed coils. The 3n concentrated coils are respectively wound around the inner winding portions of the teeth, the 3n distributed coils are respectively wound around outer winding portions of adjacent ones of the teeth, and each of the outer winding portions includes the first branch portion of one of the adjacent teeth and the second branch portion of the other one of the adjacent teeth. A commutator includes 6n commutator pieces arranged in the circumferential direction. The commutator is integrally rotatable with the armature core. The 3n concentrated coils include a first concentrated coil group including n first concentrated coils that are arranged at angular intervals of 360/n degrees and wound in a forward direction, a second concentrated coil group including n second concentrated coils that are respectively arranged adjacent to the first concentrated coils at angular intervals of 360/n degrees and wound in a reverse direction, and a third concentrated coil group including n third concentrated coils that are arranged between one of the first concentrated coils and one of the second concentrated coils at angular intervals of 360/n degrees and wound in a forward direction. The 3n distributed coils include a first distributed coil group including n first distributed coils that are arranged at angular intervals of 360/n degrees and wound in a forward direction, a second distributed coil group including n second distributed coils that are respectively arranged adjacent to the first distributed coils at angular intervals of 360/n degrees and wound in a reverse direction, and a third distributed coil group including n third distributed coils arranged between one of the first distributed coils and one of the second distributed coils at angular intervals of 360/n degrees and wound in a forward direction. Each of the second distributed coils is arranged between adjacent ones of the first concentrated coils and the third concentrated coils in the circumferential direction. The first to third concentrated coil groups are sequentially connected, and the first to third distributed coil groups are sequentially connected. An initiating end of the first distributed coil group is connected to a terminating end of the third concentrated coil group, and a terminating end of the third distributed coil group is connected to an initiating end of the first concentrated coil group. Each of the coil groups is connected to another one of the coil groups by a group of n commutator pieces arranged at equal angular intervals of 360/n. The n commutator pieces of each group are respectively adjacent to n commutator pieces of another group used to connect the subsequent coil groups.

Preferably, n is 3.

A method for winding coils applied to the armature of the above structure includes winding the n concentrated coils of each concentrated coil group sequentially from the first concentrated coil group to the third concentrated coil group, and subsequently winding the n distributed coils of each distributed coil group from the first distributed coil group to the third distributed coil group.

Another aspect of an armature in the present disclosure is provided with an armature core including 3n teeth (where n is an odd number greater than or equal to 3) arranged in a circumferential direction. Each of the 3n teeth includes an inner winding portion, which extends radially in a proximal region of the corresponding tooth, and first and second branch portions, which extend radially and branch off in a bifurcated manner from a distal end of the inner winding portion in the circumferential direction. The armature is also provided with 6n armature coils including 3n concentrated coils and 3n distributed coils. The 3n concentrated coils are respectively wound around the inner winding portions of the teeth, the 3n distributed coils are respectively wound around outer winding portions of adjacent ones of the teeth, and each of the outer winding portions includes the first branch portion of one of the adjacent teeth and the second branch portion of the other one of the adjacent teeth. A commutator includes 6n commutator pieces arranged in the circumferential direction. The commutator is integrally rotatable with the armature core. The 3n concentrated coils are in n groups of three concentrated coils that include first to nth concentrated coil groups sequentially connecting a first concentrated coil wound in a forward direction, a second concentrated coil wound in a reverse direction, and a third concentrated coil wound in a forward direction. Adjacent ones of the first to nth concentrated coil groups are connected separated from each other by 360/n degrees, and the first to nth concentrated coil groups are electrically connected in parallel. The 3n distributed coils are in n groups of three distributed coils that include first to nth distributed coil groups each sequentially connecting a first distributed coil wound in a forward direction, a second distributed coil wound in a reverse direction, and a third distributed coil wound in a forward direction. Adjacent ones of the first to nth distributed coil groups are connected separated from each other by 360/n degrees, and the first to nth distributed coil groups are electrically connected in parallel. An initiating end of each of the first to nth distributed coils is connected to a terminating end of the corresponding one of the first to nth concentrated coil groups. Each coil is connected to another one of the coils by two commutator pieces arranged at angular intervals of 360/n degrees.

Preferably, n is 3.

One aspect of a method for winding coils applied to the armature of the above structure includes winding the coils of the first to nth concentrated coil groups so that the first concentrated coils are simultaneously wound, the second concentrated coils are simultaneously wound, and the third concentrated coils are then simultaneously wound. The method further includes subsequently winding the coils of the first to nth distributed coil groups so that the first distributed coils are simultaneously wound, the second distributed coils are simultaneously wound, and the third distributed coils are then simultaneously wound.

One aspect of a direct current motor in the present disclosure includes the armature of each of the above aspects, a plurality of magnetic poles arranged in a circumferential direction radially facing distal ends of the teeth, and a plurality of power feeding brushes that are pressed and come in contact with the commutator pieces.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

An armature, a method for winding coils, and a direct current (DC) motor according to a first embodiment of the disclosure will now be described with reference to FIGS. 1 to 7.

Figure 1:
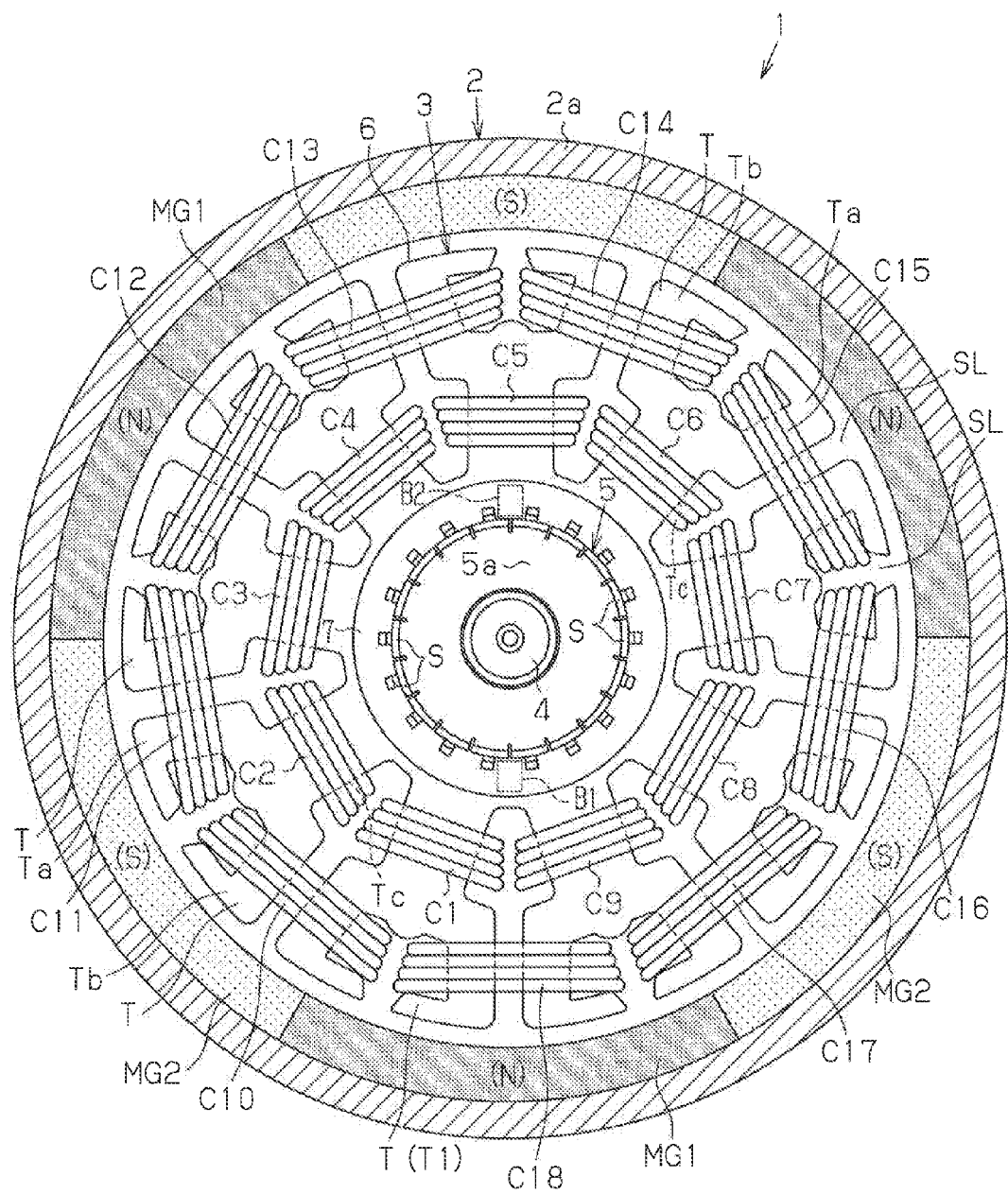
FIG. 1 is a cross-sectional view of a DC motor according to a first embodiment.

As shown in FIG. 1, the DC motor 1 includes a stator 2 and an armature 3 arranged radially inward from the stator 2.

Three first permanent magnets MG1 and three second permanent magnets MG2, which function as magnetic poles, are alternately arranged and fixed on an inner circumferential surface of a substantially cylindrical yoke housing 2a, which is a component of the stator 2. The first and second permanent magnets MG1 and MG2 are arranged with a uniform pitch (at intervals of 60 degrees in the present embodiment).

The three first permanent magnets MG1 are magnetized radially with their radially inward ends functioning as N poles and their radially outward ends functioning as S poles. The three second permanent magnets MG2 are magnetized radially with their radially inward ends functioning as S poles and their radially outward ends functioning as N poles.

In the stator 2, the three first permanent magnets MG1 with their radially inward ends functioning as N poles are arranged at intervals of 120 degrees, between which the second permanent magnets MG2 with their radially inward ends functioning as S poles are sandwiched. In other words, the three second permanent magnets MG2 with their radially inward ends functioning as S poles are arranged at intervals of 120 degrees, between which the first permanent magnets MG1 with their radially inward ends functioning as N poles are arranged. The three first permanent magnets MG1 and the three second permanent magnets MG2 are arranged alternately in the circumferential direction. The DC motor 1 thus has six magnetic poles.

As shown in FIG. 1, the armature 3 includes a rotation shaft 4, a substantially cylindrical commutator 5, which is fixed to the rotation shaft 4, and an armature core 6, which is fixed to the rotation shaft 4. The armature 3 is supported in a manner rotatable relative to the stator 2, with the rotation shaft 4 being axially supported on the stator 2. The commutator 5 and the armature core 6, which are both fixed to the rotation shaft 4, rotate integrally as the rotation shaft 4 rotates. More specifically, the DC motor 1 has three pairs of poles.

As shown in FIG. 1, the commutator 5 includes a cylindrical holder 5a, which is formed from an insulating resin material and is fixed to the rotation shaft 4, and eighteen commutator pieces S, which are arranged on an outer circumferential surface of the holder 5a.

Figure 2:
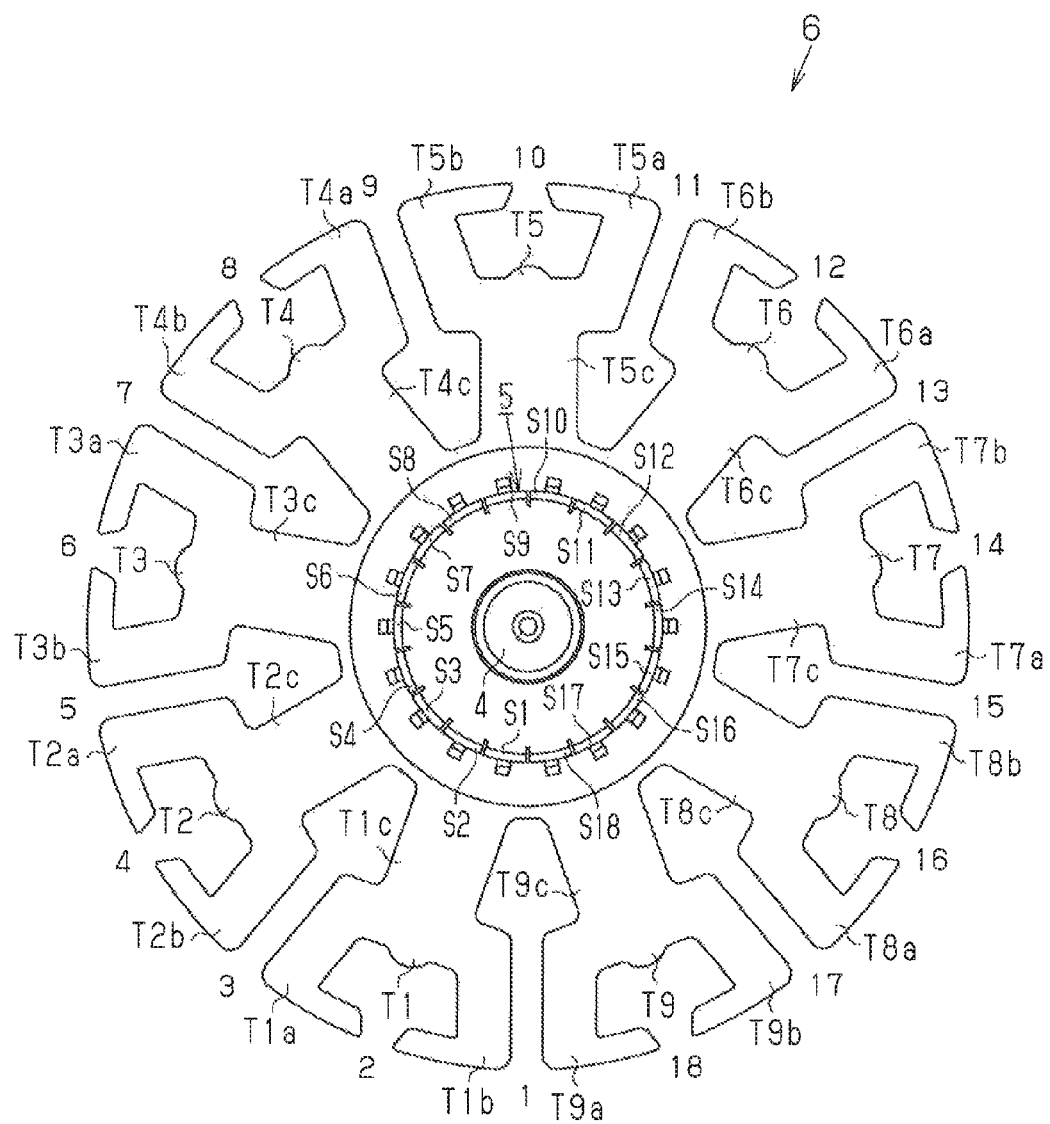
FIG. 2 is a front view of an armature core according to the first embodiment.

To identify the eighteen commutator pieces S, the eighteen commutator pieces S are respectively referred to as first to eighteenth commutator pieces S1 to S18 as shown in FIG. 2. In FIG. 2, the first to eighteenth commutator pieces S1 to S18, which are sequentially arranged clockwise, are spaced from each other on the outer circumferential surface of the holder 5a. The first to eighteenth commutator pieces S1 to S18 are arranged with a uniform pitch in the circumferential direction (at intervals of 20 degrees).

As indicated by a double-dashed line in FIG. 1, an anode-side brush B1 and a cathode-side brush B2 are arranged on the outer circumference of the commutator 5 in a manner that the brushes are in slidable contact with the first to eighteenth commutator pieces S1 to S18. The anode-side brush B1 and the cathode-side brush B2 are arranged at an interval of 180 degrees in the circumferential direction and thus face each other. The anode-side brush B1 is positioned in alignment with the middle position of the first permanent magnet MG1 in the circumferential direction. The cathode-side brush B2 is positioned in alignment with the middle position of the second permanent magnet MG2 in the circumferential direction. The armature 3 is supplied with current through the anode-side brush B1 and the cathode-side brush B2.

As shown in FIG. 1, the armature core 6 includes a cylindrical core back 7, and nine teeth T, which extend radially outwardly from the outer circumferential surface of the core back 7. The core back 7 and the teeth T are formed integrally. The core back 7 allows the rotation shaft 4 to fit inside and is fixed to the rotation shaft 4. The DC motor 1 is designed such that the number of first to eighteenth commutator pieces S1 to S18 is twice the number of the nine teeth T.

As shown in FIG. 1, each tooth T includes a first branch portion Ta and a second branch portion Tb in its distal region. Each tooth T includes an inner winding portion Tc in its proximal region, which is radially inward from its paired first and second branch portions Ta and Tb. The first branch portion Ta, which branches off clockwise from the distal end of the inner winding portion Tc in the circumferential direction, extends radially outwardly. The second branch portion Tb, which branches off counterclockwise from the distal end of the inner winding portion Tc in the circumferential direction, extends radially outwardly. Each of the teeth T bifurcates into the paired first and second branch portions Ta and Tb, thus defining eighteen slots SL in the armature core 6.

To identify the nine teeth T, the nine teeth T are respectively referred to first to ninth teeth T1 to T9 as shown in FIG. 2. In FIG. 2, the first to ninth teeth T1 to T9 are sequentially arranged clockwise with a uniform pitch (at intervals of 40 degrees) in the circumferential direction of the core back 7. The first to ninth teeth T1 to T9 are arranged in a manner that each tooth radially faces two of the first to eighteenth commutator pieces S1 to S18.

In detail, as shown in FIG. 2, the first tooth T1 faces the first and second commutator pieces S1 and S2. The second tooth T2 faces the third and fourth commutator pieces S3 and S4. The third tooth T3 faces the fifth and sixth commutator pieces S5 and S6. The fourth tooth T4 faces the seventh and eighth commutator pieces S7 and S8. The fifth tooth T5 faces the ninth and tenth commutator pieces S9 and S10. The sixth tooth T6 faces the eleventh and twelfth commutator pieces S11 and S12. The seventh tooth T7 faces the thirteenth and fourteenth commutator pieces S13 and S14. The eighth tooth T8 faces the fifteenth and sixteenth commutator pieces S15 and S16. The ninth tooth T9 faces the seventeenth and eighteenth commutator pieces S17 and S18.

The first to ninth teeth T1 to T9 include, in their distal regions, the first branch portions T1a to T9a, which branch off clockwise in the circumferential direction and extend radially outwardly, and the second branch portions T1b to T9b, which branch off counterclockwise in the circumferential direction and extend radially outwardly as shown in FIG. 2. The distal ends of the first branch portions T1a to T9a bend counterclockwise in the circumferential direction. The distal ends of the second branch portions T1b to T9b bend clockwise in the circumferential direction.

With the first to ninth teeth T1 to T9 including the paired first and second branch portion T1a and T1b to T9a and T9b in their distal regions, each of the first to ninth teeth T1 to T9 is substantially in a Y-shape as viewed axially.

The proximal regions of the first to ninth teeth T1 to T9, which are radially inward from the paired first and second branch portions T1a and T1b to T9a and T9b, are the inner winding portions T1c to T9c. More specifically, the paired first and second branch portions T1a and T1b to T9a and T9b of the first to ninth teeth T1 to T9 branch off from the distal ends of the inner winding portions T1c to T9c and extend radially outwardly.

The paired first and second branch portions T1a and T1b to T9a and T9b, which are arranged in the first to ninth teeth T1 to T9, provide the armature core 6 with the eighteen slots SL. The eighteen slots SL are identified with slot numbers, which are shown in FIGS. 2 to 6 (also in FIGS. 8A to 13C illustrating a second embodiment).

In the present embodiment, the first branch portions T1a to T9a and the second branch portions T1b to T9b each have a width in the circumferential direction that is one half the width in the circumferential direction of each of the inner winding portions T1c to T9c.

Each tooth is arranged in a manner that the middle position between the corresponding two commutator pieces is aligned with a line connecting the middle position in the interval between the paired first and second branch portion T1a and T1b to T9a and T9b (slot SL) and the central axis of the rotation shaft 4.

More specifically, the middle position between the first and second commutator pieces S1 and S2 is aligned with a line connecting the middle position in the interval between the first and second branch portions T1a and T1b of the first tooth T1 (slot SL with slot number 2) and the central axis of the rotation shaft 4.

The middle position between the third and fourth commutator pieces S3 and S4 is aligned with a line connecting the middle position in the interval between the first and second branch portions T2a and T2b of the second teeth T2 (slot SL with slot number 4) and the central axis of the rotation shaft 4. The middle position between the fifth and sixth commutator pieces S5 and S6 is aligned with a line connecting the middle position in the interval between the first and second branch portions T1a and T3b of the third teeth T3 (slot SL with slot number 6) and the central axis of the rotation shaft 4. The middle position between the seventh and eighth commutator pieces S7 and S8 is aligned with a line connecting the middle position in the interval between the first and second branch portions T4a and T4b of the fourth teeth T4 (slot SL with slot number 8) and the central axis of the rotation shaft 4. The middle position between the ninth and tenth commutator pieces S9 and S10 is aligned with a line connecting the middle position in the interval between the first and second branch portions T5a and T5b of the fifth teeth T5 (slot SL with slot number 10) and the central axis of the rotation shaft 4. The middle position between the eleventh and twelfth commutator pieces S11 and S12 is aligned with a line connecting the middle position in the interval between the first and second branch portions T6a and T6b of the sixth teeth T6 (slot SL with slot number 12) and the central axis of the rotation shaft 4. The middle position between the thirteenth and fourteenth commutator pieces S13 and S14 is aligned with a line connecting the middle position in the interval between the first and second branch portions T7a and T7b of the seventh teeth T7 (slot SL with slot number 14) and the central axis of the rotation shaft 4. The middle position between the fifteenth and sixteenth commutator pieces S15 and S16 is aligned with a line connecting the middle position in the interval between the first and second branch portions T8a and T8b of the eighth teeth T8 (slot SL with slot number 16) and the central axis of the rotation shaft 4. The middle position between the seventeenth and eighteenth commutator pieces S17 and S18 is aligned with a line connecting the middle position in the interval between the first and second branch portions T9a and T9b of the ninth tooth T9 (slot SL with slot number 18) and the central axis of the rotation shaft 4.

Adjacent teeth are arranged so that the middle position between the commutator piece corresponding to one of the two adjacent teeth and the commuter piece corresponding to the other one of the teeth is aligned with a line connecting the middle position in the interval (slot SL) between the first branch portion of one tooth and the second branch portion of the other teeth and the central axis of the rotation shaft 4.

In detail, the middle position between the second and third commutator pieces S2 and S3 is aligned with a line connecting the middle position in the interval between the first branch portion T1a of the first tooth T1 and the second branch portion T2b of the second teeth T2 (slot SL with slot number 3) and the center of the rotation shaft 4.

The middle position between the fourth and fifth commutator pieces S4 and S5 is aligned with a line connecting the middle position in the interval between the first branch portion T2a of the second tooth T2 and the second branch portion T3b of the third tooth T3 (slot SL with slot number 5) and the center of the rotation shaft 4. The middle position between the sixth and seventh commutator pieces S6 and S7 is aligned with a line connecting the middle position in the interval between the first branch portion T1a of the third tooth T3 and the second branch portion T4b of the fourth tooth T4 (slot SL with slot number 7) and the center of the rotation shaft 4. The middle position between the eighth and ninth commutator pieces S8 and S9 is aligned with a line connecting the middle position of the interval between the first branch portion T4a of the fourth tooth T4 and the second branch portion T5b of the fifth tooth T5 (slot SL with slot number 9) and the center of the rotation shaft 4. The middle position between the tenth and eleventh commutator pieces S10 and S11 is aligned with a line connecting the middle position of the interval between the first branch portion T5a of the fifth tooth T5 and the second branch portion T6b of the sixth tooth T6 (slot SL with slot number 11) and the center of the rotation shaft 4. The middle position between the twelfth and thirteenth commutator pieces S12 and S13 is aligned with a line connecting the middle position of the interval between the first branch portion T6a of the sixth tooth T6 and the second branch portion T7b of the seventh tooth T7 (slot SL with slot number 13) and the center of the rotation shaft 4. The middle position between the fourteenth and fifteenth commutator pieces S14 and S15 is aligned with a line connecting the middle position of the interval between the first branch portion T7a of the seventh tooth T7 and the second branch portion T8b of the eighth tooth T8 (slot SL with slot number 15) and the center of the rotation shaft 4. The middle position between the sixteenth and seventeenth commutator pieces S16 and S17 is aligned with a line connecting the middle position of the interval between the first branch portion T8a of the eighth tooth T8 and the second branch portion T9b of the ninth tooth T9 (slot SL with slot number 17) and the center of the rotation shaft 4. The middle position between the eighteenth and first commutator pieces S18 and S1 is aligned with a line connecting the middle position of the interval between the first branch portion T9a of the ninth tooth T9 and the second branch portion T1b of the first tooth T1 (slot SL with slot number 1) and the center of the rotation shaft 4.

As shown in FIG. 1, armature coils are wound around the teeth T (first to ninth teeth T1 to T9) of the armature core 6 with the above-described structure. The armature coils include concentrated coils and distributed coils. A concentrated coil is wound around the inner winding portion of each tooth. A distributed coil is wound around an outer winding portion of two adjacent teeth including a first branch portion Ta of one of the adjacent teeth T and a second branch portion Tb of the other one of the adjacent teeth T.

To facilitate illustration, the armature coils wound around the inner winding portions T1c to T9c of the first to ninth teeth T1 to T9 are sequentially referred to as first to ninth coils C1 to C9 clockwise from the inner winding portion T1c of the first tooth T1 to the inner winding portion T9c of the ninth tooth T9.

The armature coils wound around the outer winding portions of adjacent teeth, each of which includes the first branch portion of one tooth and the second branch portion of the other tooth, are sequentially referred to as tenth to eighteenth coils C10 to C18 clockwise from the outer winding portion including the first branch portion T1a of the first tooth T1 and the second branch portion T2b of the second tooth T2 to the outer winding portion including the first branch portion T9a of the ninth tooth T9 and the second branch portion T9b of the first tooth T1.

Thus, the first to ninth coils C1 to C9 are wound by concentrated winding around the inner winding portions T1c to T9c of the first to ninth teeth T1 to T9. The tenth to eighteenth coils C10 to C18 are wound by distributed winding around the outer winding portions of adjacent teeth, each of which includes the second branch portion of one tooth and the first branch portion of the other tooth.

Among the concentrated first to ninth coils C1 to C9, in the present embodiment, six coils, or the first, second, fourth, fifth, seventh, and eighth coils C1, C2, C4, C5, C7, and C8, are wound in a forward direction. Three coils, or the third, sixth, and ninth coils C3, C6, and C9, are wound in a reverse direction. The backward wound concentrated coils, or the third, sixth, and ninth coils C3, C6, and C9, are arranged in a pitch of 120 degrees, between which two forward wound concentrated coils are sandwiched.

The second, fifth, and eighth coils C2, C5, and C8, which are the three forward wound coils adjacent counterclockwise to the three backward wound coils, or the third, sixth, and ninth coils C3, C6, and C9, are arranged in a pitch of 120 degrees.

The fourth, seventh, and first coils C4, C7, and C1, which are the three forward wound coils adjacent clockwise to the three backward wound coils, or the third, sixth, and ninth coils C3, C6, and C9, are arranged in a pitch of 120 degrees.

A group including the three concentrated, forward wound coils, or the second, fifth, and eighth coils C2, C5, and C8, which are arranged in a pitch of 120 degrees, is referred to as a first concentrated coil group GA1. Each of the second, fifth, and eighth coils C2, C5, and C8 corresponds to a first concentrated coil.

A group including the three concentrated, backward wound coils, or the third, sixth, and ninth coils C3, C6, and C9, which are arranged in a pitch of 120 degrees, is referred to as a second concentrated coil group GA2. Each of the third, sixth, and ninth coils C3, C6, and C9 corresponds to a second concentrated coil.

A group including the three concentrated, forward wound coils, or the fourth, seventh, and first coils C4, C7, and C1, which are arranged in a pitch of 120 degrees, is referred to as a third concentrated coil group GA3. Each of the fourth, seventh, and first coils C4, C7, and C1 corresponds to a third concentrated coil.

Among the distributed tenth to eighteenth coils C10 to C18, six coils, or the eleventh, twelfth, fourteenth, fifteenth, seventeenth, and eighteenth coils C11, C12, C14, C15, C17, and C18, are wound in a forward direction. The three coils, or the tenth, thirteenth, and sixteenth coils C10, C13, and C16, are wound in a reverse direction. The backward wound distributed coils, or the tenth, thirteenth, and sixteenth coils C10, C13, and C16, are arranged in a pitch of 120 degrees, between which two forward wound distributed coils are sandwiched.

The eighteenth, twelfth, and fifteenth coils C18, C12, and C15, which are the three coils adjacent counterclockwise to the three backward wound coils, or the tenth, thirteenth, and sixteenth coils C10, C13, and C16, are arranged in a pitch of 120 degrees.

The eleventh, fourteenth, and seventeenth coils C11, C14, and C17, which are the three coils adjacent clockwise to the three backward wound coils, or the tenth, thirteenth, and sixteenth coils C10, C13, and C16, are arranged in a pitch of 120 degrees.

A group including the three distributed, forward wound coils, or the eighteenth, twelfth, and fifteenth coils C18, C12, and C15, which are arranged in a pitch of 120 degrees, is referred to as a first distributed coil group GB1. Each of the eighteenth, twelfth, and fifteenth coils C18, C12, and C15 corresponds to a first distributed coil.

A group including the three distributed, backward wound coils, or the tenth, thirteenth, and sixteenth coils C10, C13, and C16, which are arranged in a pitch of 120 degrees, is referred to as a second distributed coil group GB2. Each of the tenth, thirteenth, and sixteenth coils C10, C13, and C16 corresponds to a second distributed coil.

A group including the three distributed, forward wound coils, or the eleventh, fourteenth, and seventeenth coils C11, C14, and C17, which are arranged in a pitch of 120 degrees, is referred to as a third distributed coil group GB3. Each of the eleventh, fourteenth, and seventeenth coils C11, C14, and C17 corresponds to a third distributed coil.

The third, sixth, and ninth coils C3, C6, and C9 of the second concentrated coil group GA2 and the backward wound tenth, thirteenth, and sixteenth coils C10, C13, and C16 of the second distributed coil group GB2 are arranged alternately in a pitch of 60 degrees.

The second distributed coil is arranged between the first concentrated coil and the third concentrated coil that are adjacent in the circumferential direction. More specifically, the tenth, thirteenth, and sixteenth coils C10, C13, and C16 of the second distributed coil group GB2 are respectively arranged between the second, fifth, and eighth coils C2, C5, and C8 of the first concentrated coil group GA1 and the first, fourth, and seventh coils C1, C4, and C7 of the third concentrated coil group GA3 in the circumferential direction.

A procedure for winding the first to eighteenth coils C1 to C18 around the first to eighteenth teeth T1 to T18 of the armature core will now be described with reference to FIG. 3A to FIG. 7.

Figure 6:
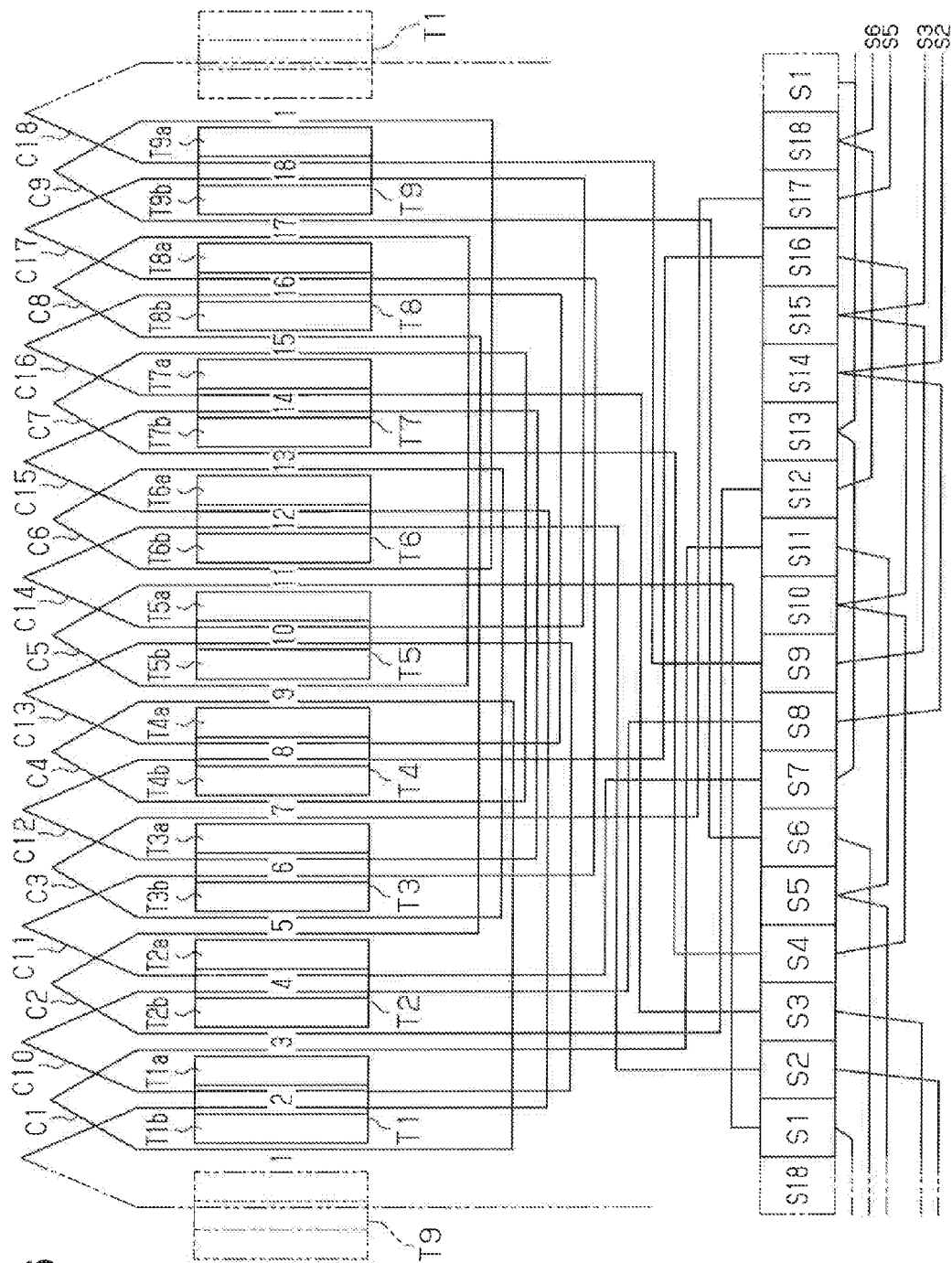
FIG. 6 is a diagram describing connections of the armature coils according to the first embodiment.
Figure 7:
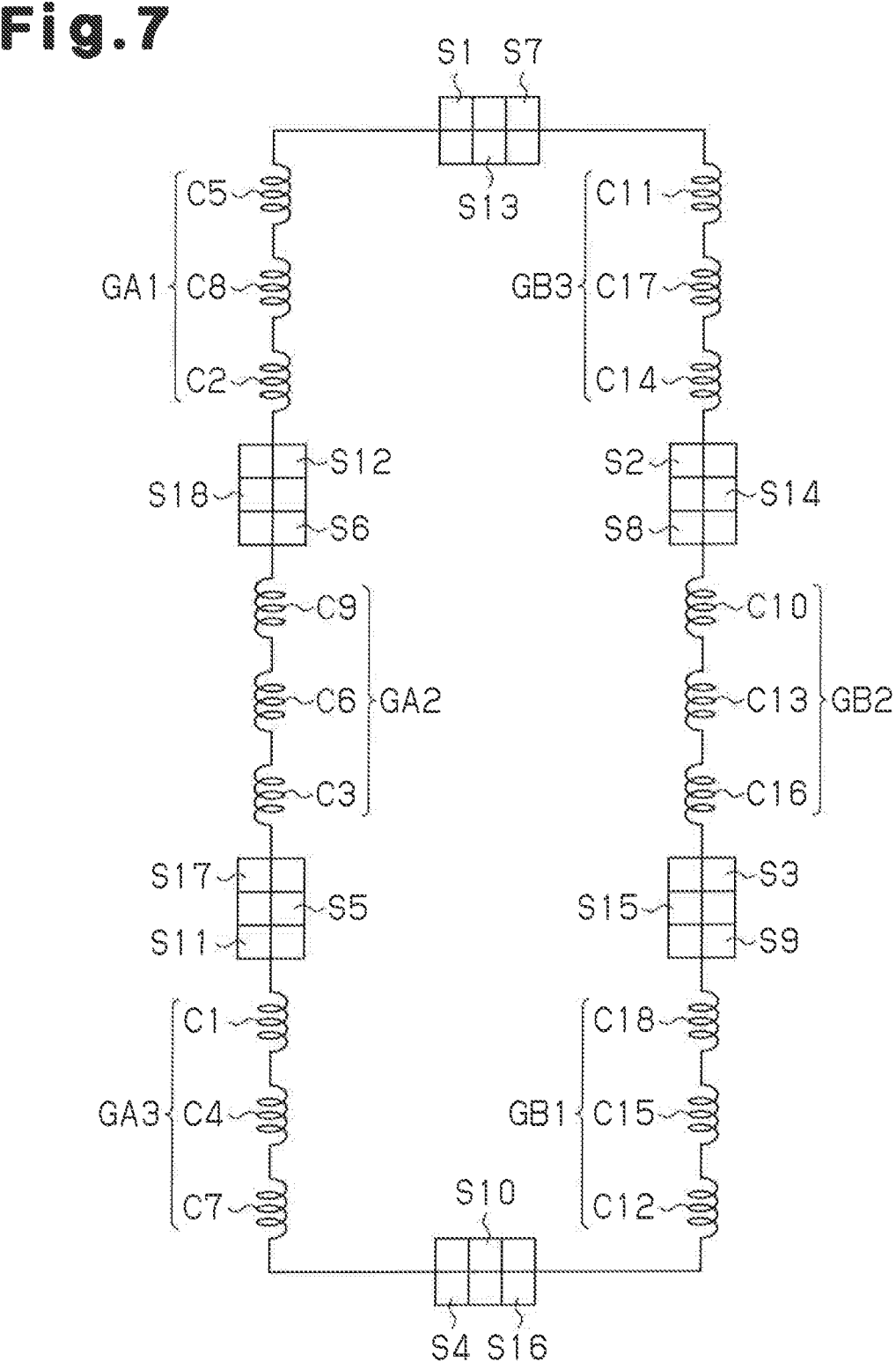
FIG. 7 is an equivalent circuit diagram of the armature coils according to the first embodiment.

As shown in FIGS. 6 and 7, an insulator-coated conductive wire for coils, with its initiating end being hooked onto and retained on a riser of the seventh commutator piece S7, is laid out clockwise to the thirteenth commutator piece S13, which is separated clockwise by 120 degrees. The conductive wire hooked onto a riser of the thirteenth commutator piece S13 is then laid out clockwise to the first commutator piece S1, which is separated clockwise by 120 degrees, and is hooked onto a riser of the first commutator piece S1.

Figure 3A:
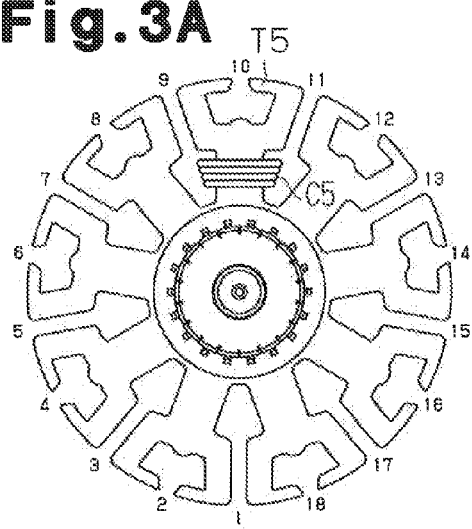
FIGS. 3A to 3F are diagrams illustrating procedures for winding armature coils according to the first embodiment.

The conductive wire hooked onto the riser of the first commutator piece S1 is then laid out clockwise to slot number 11 as shown in FIG. 6, and is wound in a forward direction around the inner winding portion T5c of the fifth tooth T5 between slot numbers 11 and 9. This forms the concentrated, forward wound fifth coil C5 as shown in FIG. 3A.

Figure 3D:
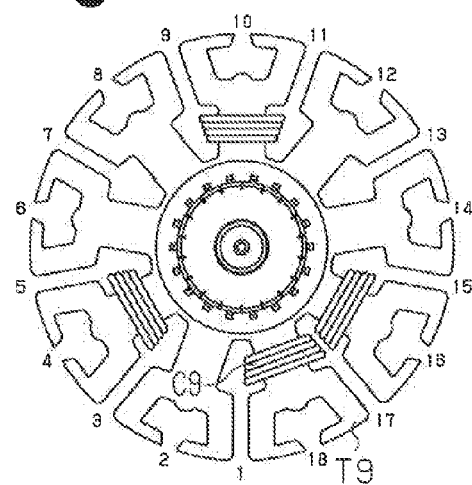
Figure 3B:
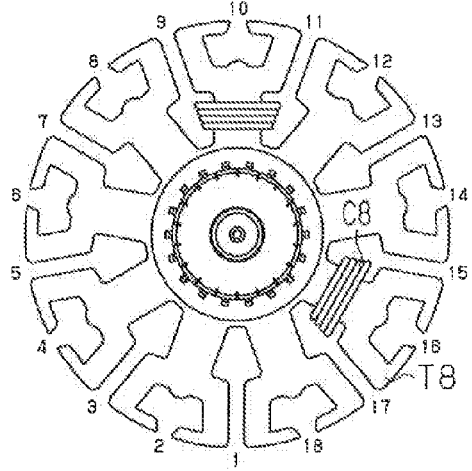

After winding the fifth coil C5, the conductive wire is laid out clockwise from slot number 9 to slot number 17 as shown in FIG. 6, and is wound in a forward direction around the inner winding portion T8c of the eighth tooth T8 between slot numbers 17 and 15. This forms the concentrated, forward wound eighth coil C8 as shown in FIG. 3B. More specifically, the eighth coil C8 is separated clockwise by 120 degrees from the fifth coil C5.

Figure 3E:
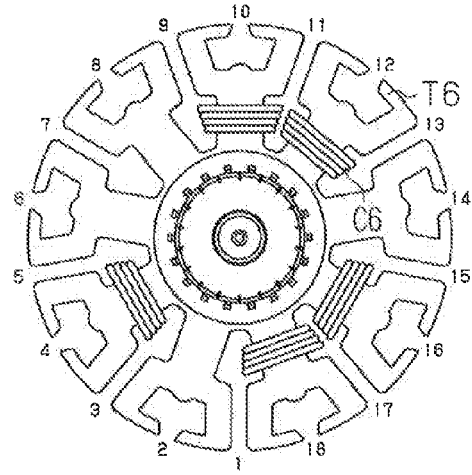
Figure 3C:
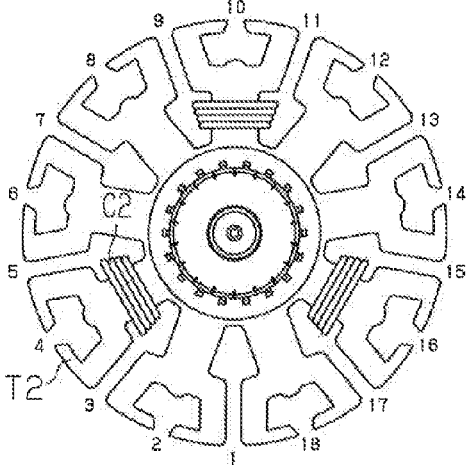

After winding the eighth coil C8, the conductive wire is laid out clockwise from slot number 15 to slot number 5 as shown in FIG. 6, and is wound in a forward direction around the inner winding portion T2c of the second teeth T2 between slot numbers 5 and 3. This forms the concentrated, forward wound second coil C2 as shown in FIG. 3C. More specifically, the second coil C2 is separated clockwise by 120 degrees from the eighth coil C8. As shown in FIG. 7, the above procedure completes the three forward wound coils included in the first concentrated coil group GA1, or the fifth coil C5, the eighth coil C8, and the second coil C2, wound in a pitch of 120 degrees.

After winding the second coil C2, the conductive wire is laid out from slot number 3 to the twelfth commutator piece S12 as shown in FIG. 6, and is hooked onto a riser of the twelfth commutator piece S12. The conductive wire hooked onto the riser of the twelfth commutator piece S12 is laid out clockwise to the eighteenth commutator piece S18, which is separated clockwise by 120 degrees as shown in FIG. 6, and is hooked onto a riser of the eighteenth commutator piece S18. The conductive wire hooked onto the riser of the eighteenth commutator piece S18 is laid out clockwise to the sixth commutator piece S6, which is separated clockwise by 120 degrees, and is hooked onto the riser of the sixth commutator piece S6.

The twelfth, eighteenth, and sixth commutator pieces S12, S18, and S6 are adjacent counterclockwise to the seventh, thirteenth, and first commutator pieces S7, S13, and S1, over which the conductive wire is hooked and laid out before the first concentrated coil group GA1 is wound. More specifically, the twelfth commutator piece S12 is adjacent counterclockwise to the thirteenth commutator piece S13. The eighteenth commutator piece S18 is adjacent counterclockwise to the first commutator piece S1. The sixth commutator piece S6 is adjacent counterclockwise to the seventh commutator piece S7.

The conductive wire hooked onto the riser of the sixth commutator piece S6 is laid out to slot number 17 as shown in FIG. 6, and is wound in a reverse direction around the inner winding portion T9c of the ninth tooth T9 between slot numbers 17 and 1. This forms the concentrated, backward wound ninth coil C9 as shown in FIG. 3D.

After winding the ninth coil C9, the conductive wire is laid out counterclockwise from slot number 1 to slot number 11 as shown in FIG. 6, and is wound in a reverse direction around the inner winding portion T6c of the sixth tooth T6 between slot numbers 11 and 13. This forms the concentrated, backward wound sixth coil C6 as shown in FIG. 3E. More specifically, the sixth coil C6 is separated counterclockwise by 120 degrees from the ninth coil C9.

Figure 3F:
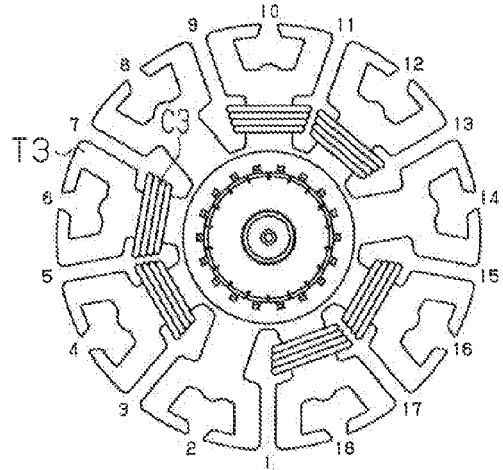

After winding the sixth coil C6, the conductive wire is laid out counterclockwise from slot number 13 to slot number 5 as shown in FIG. 6, and is wound in a reverse direction around the inner winding portion T2c of the third tooth T3 between slot numbers 5 and 7. This forms the concentrated, backward wound third coil C3 as shown in FIG. 3F. More specifically, the third coil C3 is separated counterclockwise by 120 degrees from the sixth coil C6. As shown in FIG. 7, the above procedure completes the three backward wound coils included in the second concentrated coil group GA2, or the ninth coil C9, the sixth coil C6, and the third coil C3, wound in a pitch of 120 degrees.

After winding the third coil C3, the conductive wire is laid out from slot number 7 to the seventeenth commutator piece S17 as shown in FIG. 6, and is hooked onto a riser of the seventeenth commutator piece S17. The conductive wire hooked onto the riser of the seventeenth commutator piece S17 is laid out clockwise to the fifth commutator piece S5, which is separated clockwise by 120 degrees as shown in FIG. 6, and is hooked onto a riser of the fifth commutator piece S5. The conductive wire hooked onto the riser of the fifth commutator piece S5 is laid out clockwise to the eleventh commutator piece S11, which is separated clockwise by 120 degrees, and is hooked onto a riser of the eleventh commutator piece S11.

The seventeenth, fifth, and eleventh commutator pieces S17, S5, and S11 are respectively adjacent counterclockwise to the twelfth, eighteenth, and sixth commutator pieces S12, S18, and S6, over which the conductive coil is hooked and laid out between the first concentrated coil group GA1 and the second concentrated coil group GA2.

Figure 4A:
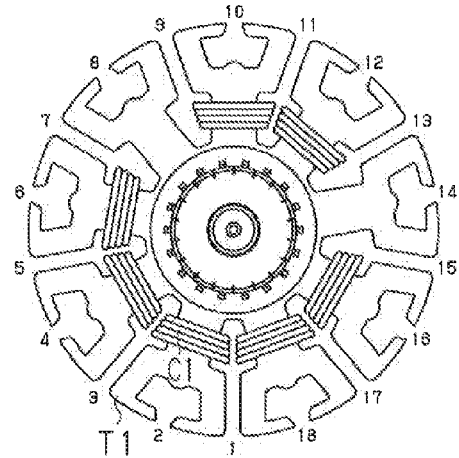
FIGS. 4A to 4F are diagrams illustrating the procedures for winding armature coils according to the first embodiment.

The conductive wire hooked onto the riser of the eleventh commutator piece S11 is laid out to slot number 3 as shown in FIG. 6, and is wound in a forward direction around the inner winding portion T1c of the first tooth T1 between slot numbers 3 and 1. This forms the concentrated, forward wound first coil C1 as shown in FIG. 4A.

Figure 4D:
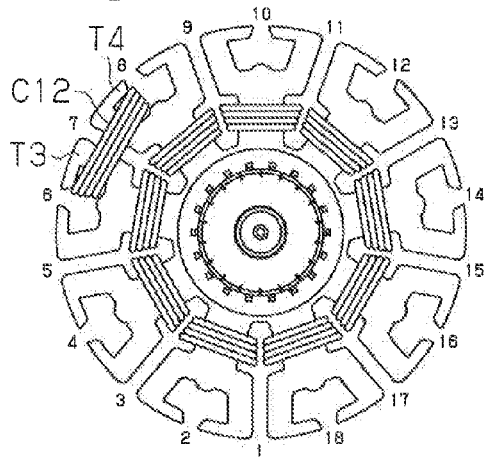
Figure 4B:
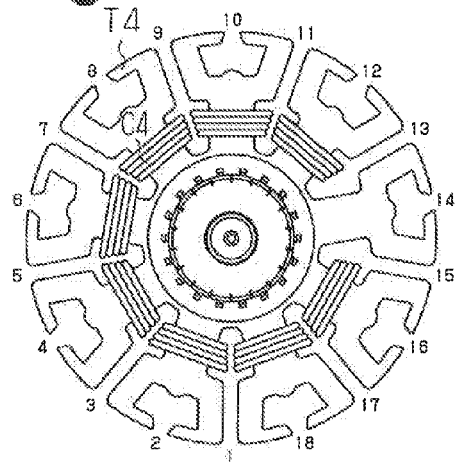

After winding the first coil C1, the conductive wire is laid out clockwise from slot number 1 to slot number 9 as shown in FIG. 6, and is wound in a forward direction around the inner winding portion T4c of the fourth tooth T4 between slot numbers 9 and 7. This forms the concentrated, forward wound fourth coil C4 as shown in FIG. 4B. More specifically, the fourth coil C4 is separated clockwise by 120 degrees from the first coil C1.

Figure 4E:
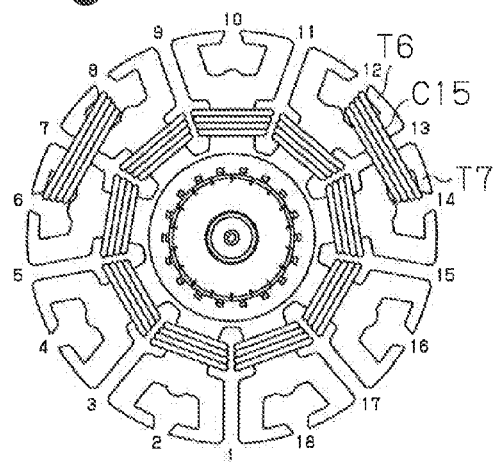
Figure 4C:
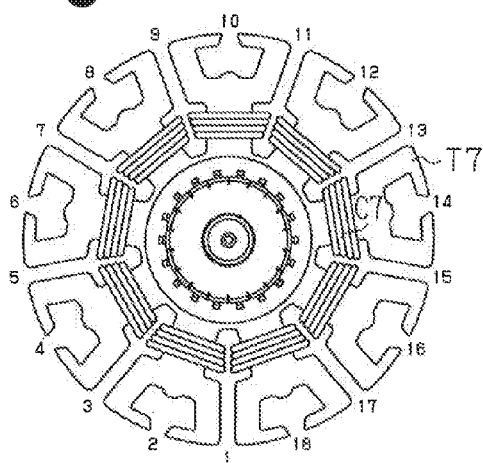

After winding the fourth coil C4, the conductive wire is laid out clockwise from slot number 7 to slot number 15 as shown in, FIG. 6, and is wound in a forward direction around the inner winding portion T7c of the seventh tooth T7 between slot numbers 15 and 13. This forms the concentrated, forward wound seventh coil C7 as shown in FIG. 4C. More specifically, the seventh coil C7 is separated clockwise by 120 degrees from the fourth coil C4. As shown in FIG. 7, the above procedure completes the three forward wound coils included in the third concentrated coil group GA3, or the first coil C1, the fourth coil C4, and the seventh coil C7, wound in a pitch of 120 degrees, and completes all the concentrated coils, or the first to ninth coils C1 to C9.

After winding the seventh coil C7, the conductive wire is laid out from slot number 13 to the fourth commutator piece S4 as shown in is FIG. 6, and is hooked onto a riser of the fourth commutator piece S4. The fourth commutator piece S4 hooked onto the riser of the conductive wire is laid out clockwise to the tenth commutator piece S10, which is separated clockwise by 120 degrees as shown in FIG. 6, and is hooked onto a riser of the tenth commutator piece S10. The conductive wire hooked onto the riser of the tenth commutator piece S10 is laid out clockwise to the sixteenth commutator piece S16, which is separated clockwise by 120 degrees, and is hooked onto a riser of the sixteenth commutator piece S16.

The fourth, tenth, and sixteenth commutator pieces S4, S10, and S16 are respectively adjacent counterclockwise to the seventeenth, fifth, and eleventh commutator pieces S17, S5, and S11, over which the conductive wire is hooked and laid out between the second concentrated coil group GA2 and the third concentrated coil group GA3.

The conductive wire hooked onto the riser of the sixteenth commutator piece S16 is laid out to slot number 8 as shown in FIG. 6, and is wound in a forward direction around the outer winding portion including the second branch portion T4b of the fourth tooth T4 and the first branch portion T1a of the third tooth T3 between slot numbers 8 and 6. This forms the distributed, forward wound twelfth coil C12 as shown in FIG. 4D.

After winding the twelfth coil C12, the conductive wire is laid out clockwise from slot number 6 to slot number 14 as shown in FIG. 6, and is wound in a forward direction around the outer winding portion including the second branch portion T7b of the seventh tooth T7 and the first branch portion T6a of the sixth tooth T6 between slot numbers 14 and 12. This forms the distributed, forward wound fifteenth coil C15 as shown in FIG. 4E. More specifically, the fifteenth coil C15 is separated clockwise by 120 degrees from the twelfth coil C12.

Figure 4F:
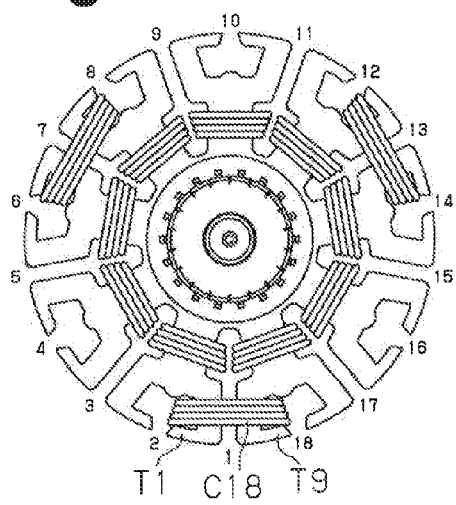

After winding the fifteenth coil C15, the conductive wire is laid out clockwise from slot number 12 to slot number 2 as shown in FIG. 6, and is wound in a forward direction around the outer winding portion including the second branch portion T1b of the first tooth T1 and the first branch portion T9a of the ninth tooth T9 between slot numbers 2 and 18. This forms the distributed, forward wound eighteenth coil C18 as shown in FIG. 4F. More specifically, the eighteenth coil C18 is separated clockwise by 120 degrees from the fifteenth coil C15. As shown in FIG. 7, the above procedure completes the three forward wound coils included in the first distributed coil group GB1, or the twelfth coil C12, the fifteenth coil C15, and the eighteenth coil C18, wound in a pitch of 120 degrees.

After winding the eighteenth coil C18, the conductive wire is laid out from slot number 18 to the ninth commutator piece S9 as shown in FIG. 6, and is hooked onto a riser of the ninth commutator piece S9. The conductive wire hooked onto the riser of the ninth commutator piece S9 is laid out clockwise from the fifteenth commutator piece S15, which is separated clockwise by 120 degrees as shown in FIG. 6, and is hooked onto a riser of the fifteenth commutator piece S15. The conductive wire hooked onto the riser of the fifteenth commutator piece S15 is laid out clockwise to the third commutator piece S3, which is separated clockwise by 120 degrees, and is hooked onto the riser of the third commutator piece S3.

The ninth, fifteenth, and third commutator pieces S9, S15, and S3 are respectively adjacent counterclockwise to the fourth, tenth, and sixteenth commutator pieces S4, S10, and S16, over which the conductive wire is hooked and laid out between the third concentrated coil group GA3 and the first distributed coil group GB1.

Figure 5A:
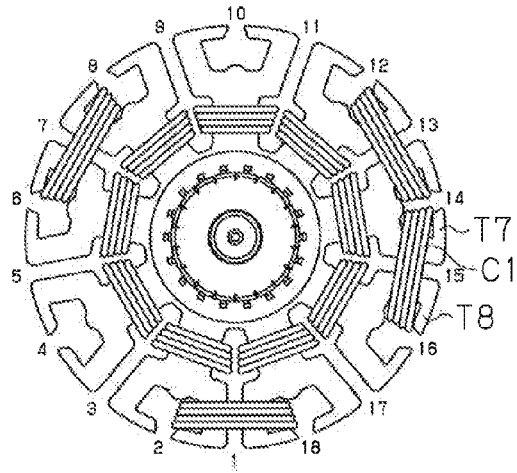
FIGS. 5A to 5F are diagrams illustrating the procedures for winding armature coils according to the first embodiment.

The conductive wire hooked onto the riser of the third commutator piece S3 is laid out to slot number 14 as shown in FIG. 6, and is wound in a reverse direction around the outer winding portion including the first branch portion T7a of the seventh tooth T7 and the second branch portion T8b of the eighth tooth T8 between slot numbers 14 and 16. This forms the distributed, backward wound sixteenth coil C16 as shown in FIG. 5A.

Figure 5D:
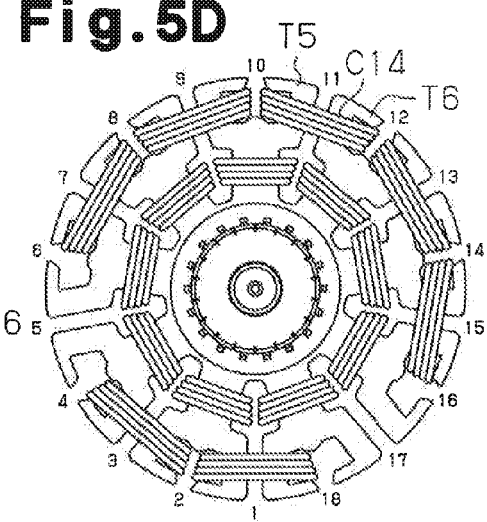
Figure 5B:
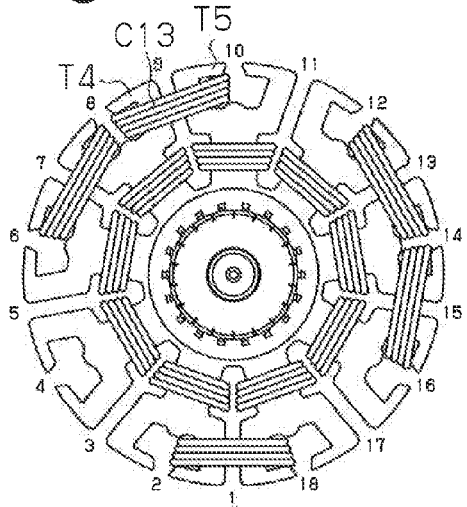

After winding the sixteenth coil C16, the conductive wire is laid out counterclockwise from slot number 16 to slot number 8 as shown in FIG. 6, and is wound in a reverse direction around the outer winding portion including the first branch portion T7a of the fourth tooth T4 and the second branch portion T5b of the fifth tooth T5 between slot numbers 8 and 10. This forms the distributed, backward wound thirteenth coil C13 as shown in FIG. 5B. More specifically, the thirteenth coil C13 is separated counterclockwise by 120 degrees from the sixteenth coil C16.

Figure 5E:
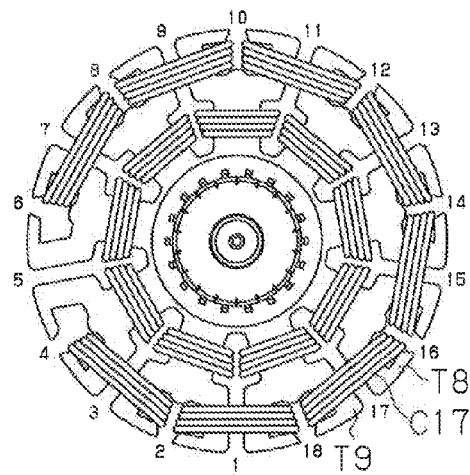
Figure 5C:
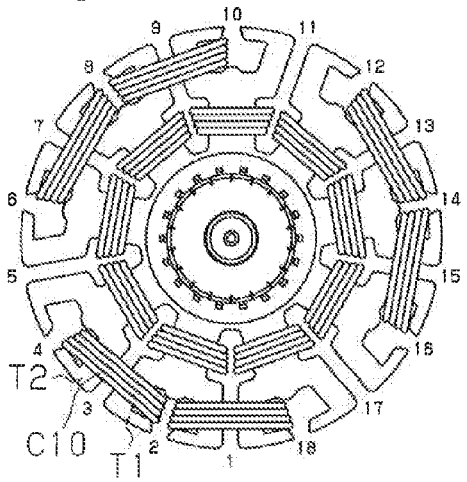

After winding the thirteenth coil C13, the conductive wire is laid out counterclockwise from slot number 10 to slot number 2 as shown in FIG. 6, and is wound in a reverse direction around the outer winding portion including the first branch portion T1a of the first tooth T1 and the second branch portion T2b of the second tooth T2 between slot numbers 2 and 4. This forms the distributed, backward wound tenth coil C10 as shown in FIG. 5C. More specifically, the tenth coil C10 is separated counterclockwise by 120 degrees from the thirteenth coil C13. As shown in FIG. 7, the above procedure completes the three backward wound coils included in the second distributed coil group GB2, or the sixteenth coil C16, the thirteenth coil C13, and the tenth coil C10, wound in a pitch of 120 degrees.

After winding the tenth coil C10, the conductive wire is laid out from slot number 4 to the eighth commutator piece S8 as shown in FIG. 6, and is hooked onto a riser of the eighth commutator piece S8. The conductive wire hooked onto the riser of the eighth commutator piece S8 is laid out clockwise to the fourteenth commutator piece S14, which is separated clockwise by 120 degrees as shown in FIG. 6, and is hooked onto a riser of the fourteenth commutator piece S14. The conductive wire hooked onto the riser of the fourteenth commutator piece S14 is laid out clockwise to the second commutator piece S2, which is separated clockwise by 120 degrees, and is hooked onto a riser of the second commutator piece S2.

The eighth, fourteenth, and second commutator pieces S8, S14, and S2 are respectively adjacent counterclockwise to the ninth, fifteenth, and third commutator pieces S9, S15, and S3, over which the conductive wire is hooked and laid out between the first distributed coil group GB1 and the second distributed coil group GB2.

The conductive wire hooked onto the riser of the second commutator piece S2 is laid out to slot number 12 as shown in FIG. 6, and is wound in a forward direction around the outer winding portion including the second branch portion T6b of the sixth tooth T6 and the first branch portion T5a of the fifth tooth T5 between slot numbers 12 and 10. This forms the distributed, forward wound fourteenth coil C14 as shown in FIG. 5D.

After winding the fourteenth coil C14, the conductive wire is laid out clockwise from slot number 10 to slot number 18 as shown in FIG. 6, and is wound in a forward direction around the outer winding portion including the second branch portion T9b of the ninth tooth T9 and the first branch portion T8a of the eighth tooth T8 between slot numbers 18 and 16. This forms the distributed, forward wound seventeenth coil C17 as shown in FIG. 5E. More specifically, the seventeenth coil C17 is separated clockwise by 120 degrees from the fourteenth coil C14.

Figure 5F:
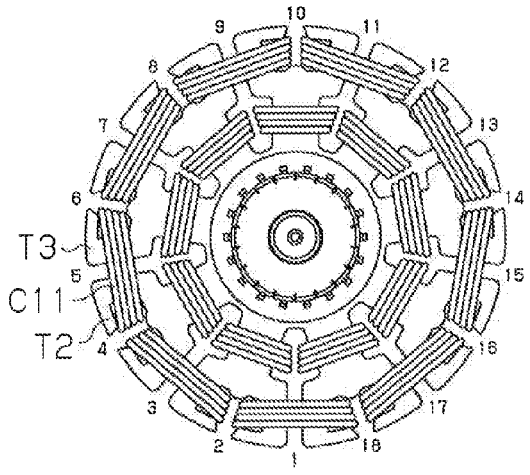

After winding the seventeenth coil C17, the conductive wire is laid out clockwise from slot number 16 to slot number 6 as shown in FIG. 6, and is wound in a forward direction around the outer winding portion including the second branch portion T2b of the third tooth T3 and the first branch portion T2a of the second tooth T2 between slot numbers 6 and 4. This forms the distributed, forward wound eleventh coil C11 as shown in FIG. 5F. More specifically, the eleventh coil C11 is separated clockwise by 120 degrees from the seventeenth coil C17. As shown in FIG. 7, the above procedure completes the three backward wound coils included in the third distributed coil group GB3, or the fourteenth coil C14, the seventeenth coil C17, and the eleventh coil C11, wound in a pitch of 120 degrees, and completes all the distributed coils, or the tenth to eighteenth coils C10 to C18.

After winding the eleventh coil C11, the conductive wire is laid out from slot number 4 to the seventh commutator piece S7, over which the initiating end of the conductive wire is looped, as shown in FIG. 6, and is hooked onto and retained on a riser of the seventh commutator piece S7. More specifically, this connects the third distributed coil group GB3 and the first concentrated coil group GA1.

The first to eighteenth coils C1 to C18 are sequentially wound continuously from a single conductive wire for coils. This completes the winding procedure.

The seventh, third, and first commutator pieces S7, S13, and S1, over which the conductive wire is hooked and laid out between the third distributed coil group GB3 and the first concentrated coil group GA1, are adjacent counterclockwise to the eighth, fourteenth, and second commutator pieces S8, S14, and S2, over which the conductive wire is hooked and laid out between the second distributed coil group GB2 and the third distributed coil group GB3.

The above embodiment has the advantages described below.

In the above embodiment, among the concentrated first to ninth coils C1 to C9, the second, fifth, and eighth coils C2, C5, and C8 (first concentrated coils), which are the three coils arranged in a pitch of 120 degrees, are assigned to the first concentrated coil group GA1. In the same manner, the third, sixth, and ninth coils C3, C6, and C9 (second concentrated coils), which are the three coils arranged in a pitch of 120 degrees, are assigned to the second concentrated coil group GA2. Further, the fourth, seventh, and first coils C4, C7, and C1 (third concentrated coils), which are the three coils arranged in a pitch of 120 degrees, are assigned to the third concentrated coil group GA3.

Among the distributed tenth to eighteenth coils C10 to C18, the eighteenth, twelfth, and fifteenth coils C18, C12, and C15 (first distributed coils), which are the three coils arranged in a pitch of 120 degrees, are assigned to the first distributed coil group GB1. In the same manner, the tenth, thirteenth, and sixteenth coils C10, C13, and C16 (second distributed coils), which are the three coils arranged in a pitch of 120 degrees, are assigned to the second distributed coil group GB2. In the same manner, the eleventh, fourteenth, and seventeenth coils C11, C14, and C17 (third distributed coils), which are the three coils arranged in a pitch of 120 degrees, are assigned to the third distributed coil group GB3.

The three coils of the respective groups are wound sequentially in the order of the first concentrated coil group GA1, the second concentrated coil group GA2, and third concentrated coil group GA3. After all the nine coils of the first to third concentrated coil groups GA1 to GA3 are wound, the three coils of the respective groups are wound sequentially in the order of the first distributed coil group GB1, the second distributed coil group GB2, and the third distributed coil group GB3.

In this manner, all the coils are wound continuously from a single conductive wire.

Although the method for winding coils is used for the armature 3 with nine teeth T, that is, the first to ninth teeth T1 to T9, in the present embodiment, the method is also applicable to an armature with a number of teeth T other than the nine teeth T.

Second Embodiment

The present embodiment differs from the first embodiment in the method for winding the first to eighteenth coils C1 to C18 described with reference to FIG. 1 in the first embodiment.

In detail, the first to eighteenth coils C1 to C18 are formed by continuously winding the single wire from one position in the first embodiment. In the present embodiment, the first to eighteenth coils C1 to C18 are formed by winding wires from three different positions at the same time.

Such a method for winding coils will now be described in detail with reference to FIG. 8A to FIG. 14C. Components that are the same as those of the first embodiment will not be described in detail.

Unlike in the first embodiment, the first concentrated coil group GA1 in the present embodiment includes three coils, that is, a forward wound fifth coil C5 (first concentrated coil), a backward wound sixth coil C6 (second concentrated coil), and a forward wound first coil C1 (third concentrated coil).

The second concentrated coil group GA2 includes three coils, that is, a forward wound eighth coil C8 (first concentrated coil), a backward wound ninth coil C9 (second concentrated coil), and a forward wound fourth coil C4 (third concentrated coil).

Further, the third concentrated coil group GA3 includes three coils, that is, a forward wound second coil C2 (first concentrated coil), a backward wound third coil C3 (second concentrated coil), and a forward wound seventh coil C7 (third concentrated coil).

In the same manner, unlike in the first embodiment, the first distributed coil group GB1 includes three coils, that is, a forward wound twelfth coil C12 (first distributed coil), a backward wound thirteenth coil C13 (second distributed coil), and a forward wound seventeenth coil C17 (third distributed coil).

The second distributed coil group GB2 includes three coils, that is, a forward wound fifteenth coil C15 (first distributed coil), a backward wound sixteenth coil C16 (second distributed coil), and a forward wound eleventh coil C11 (third distributed coil).

The third distributed coil group GB3 includes three coils, that is, a forward wound eighteenth coil C18 (first distributed coil), a backward wound tenth coil C10 (second distributed coil), and a forward wound fourteenth coil C14 (third distributed coil).

Figure 8A:
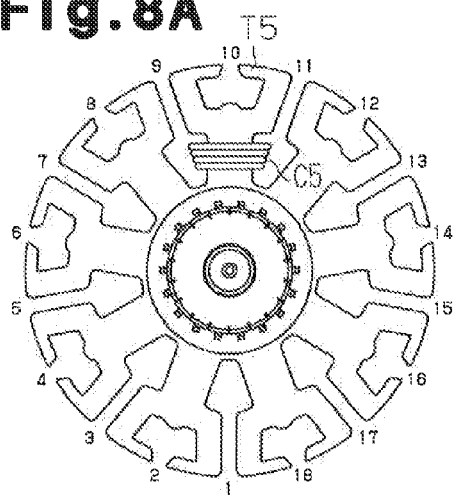
FIGS. 8A to 8F are diagrams illustrating procedures for winding armature coils according to a second embodiment.
Figure 8D:
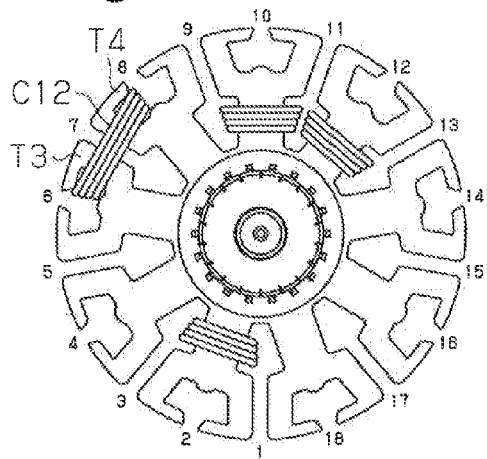
Figure 8B:
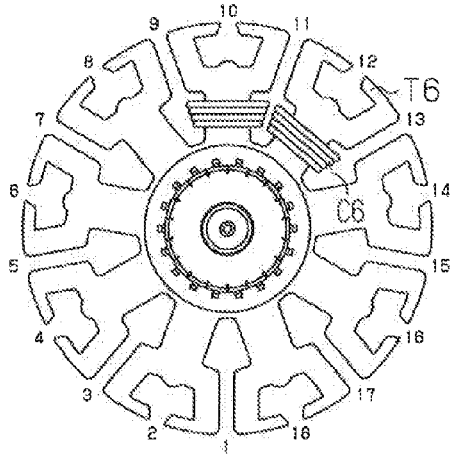
Figure 8E:
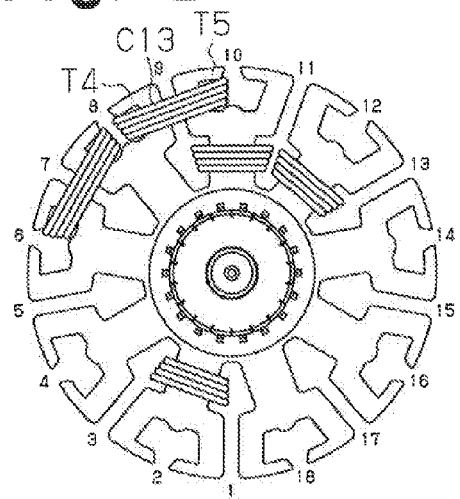
Figure 8C:
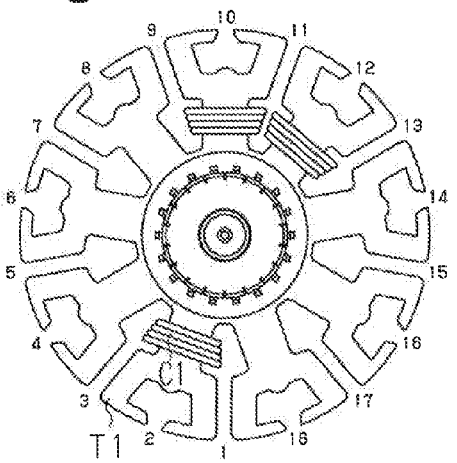
Figure 8F:
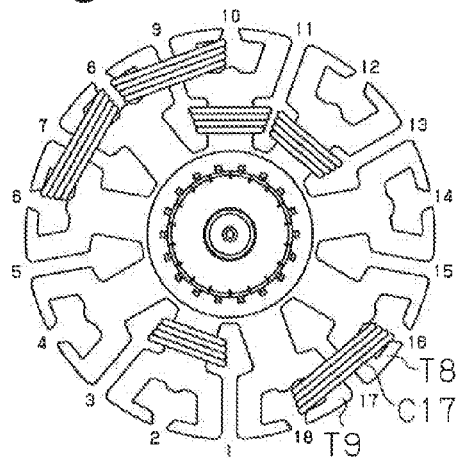
Figure 9A:
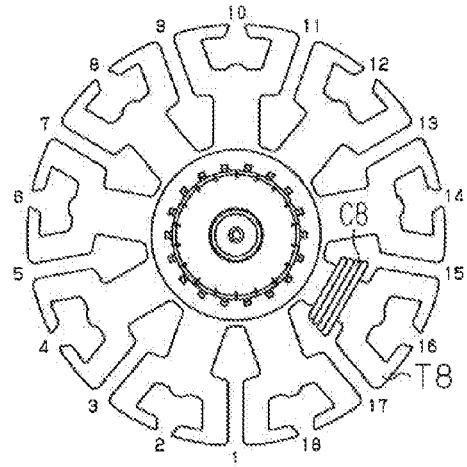
FIGS. 9A to 9F are diagrams illustrating the procedures for winding armature coils according to the second embodiment.
Figure 9D:
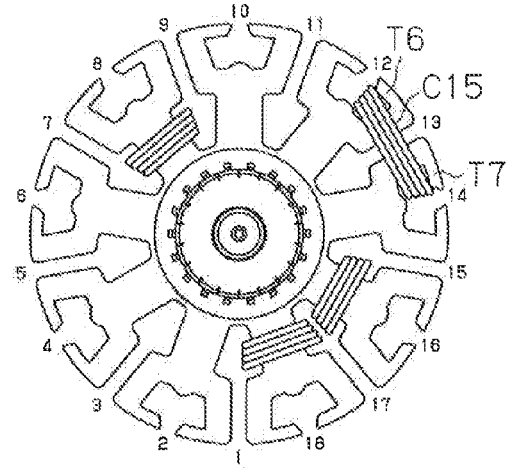
Figure 9B:
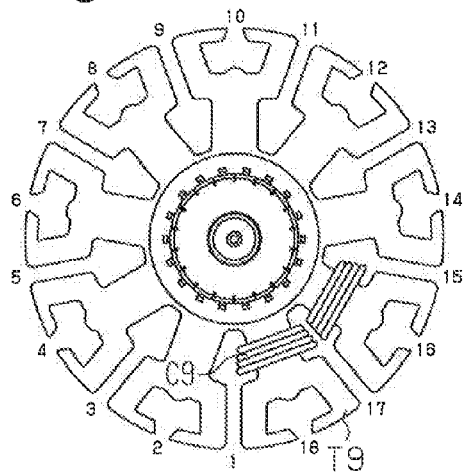
Figure 9E:
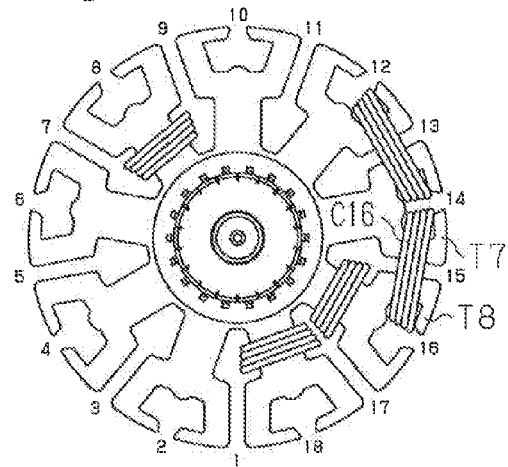
Figure 9C:
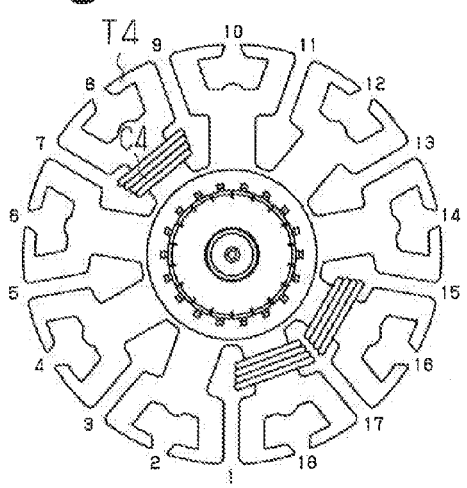
Figure 9F:
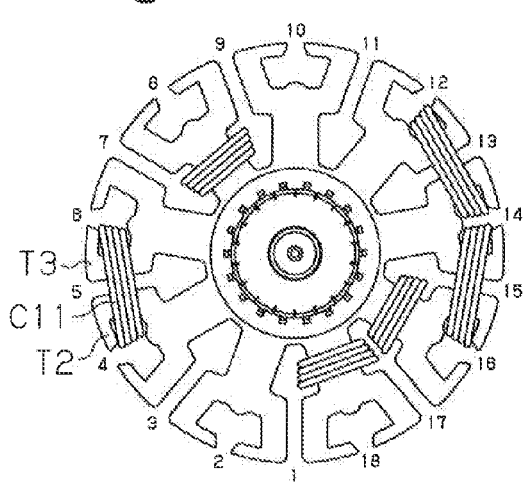
Figure 10A:
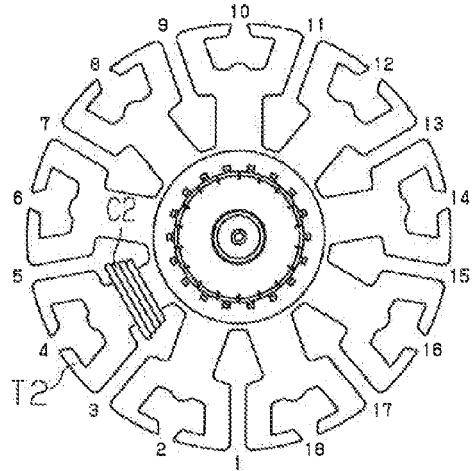
FIGS. 10A to 10F are diagrams illustrating the procedures for winding armature coils according to the second embodiment.
Figure 10D:
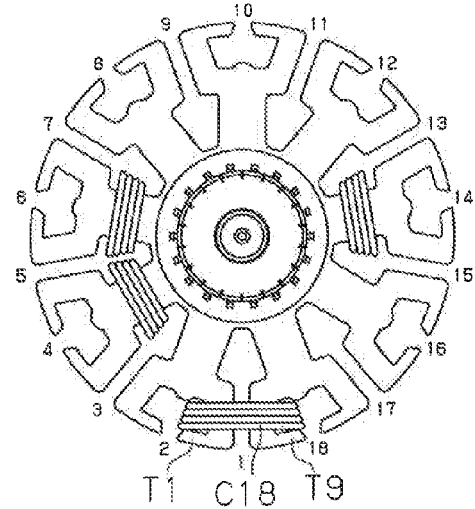
Figure 10B:
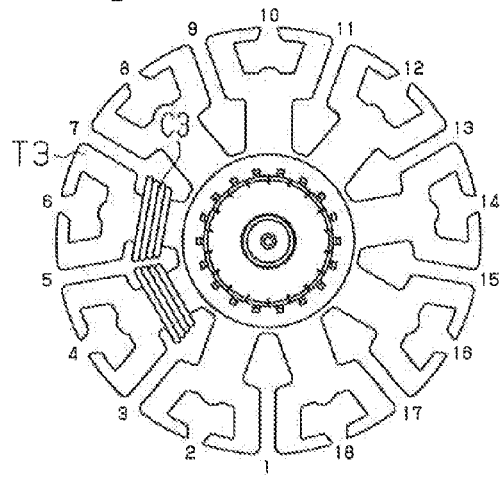
Figure 10E:
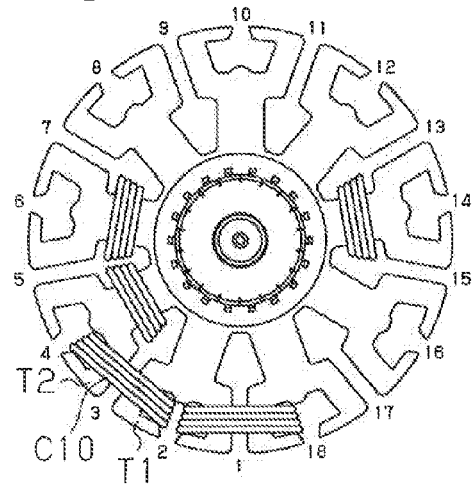
Figure 10C:
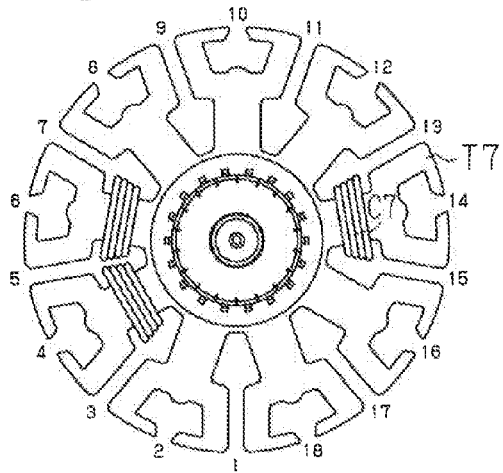
Figure 10F:
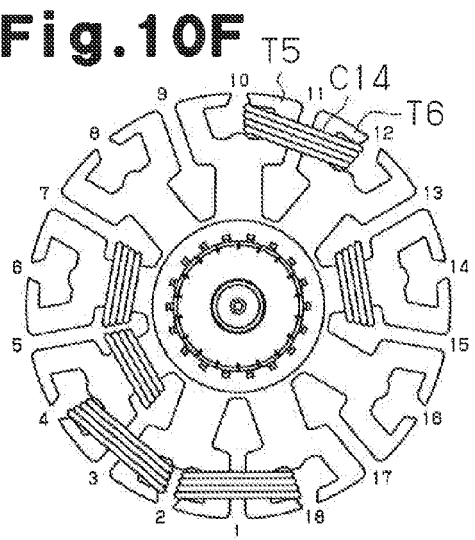

In the present embodiment, the wire windings are initiated at three positions, which are respectively shown in FIGS. 8A, 9A, and 10A at the same time (the fifth coil C5, the eighth coil C8, and the second coil C2), and terminated at three positions, which are respectively shown in FIGS. 8F, 9F, and 10F (the seventeenth coil C17, the eleventh coil C11, and the fourteenth coil C14). More specifically, the first concentrated coils (C5, C8, and C2) shown in FIGS. 8A, 9A, and 10A are first wound at the same time, and then the second concentrated coils (C6, C9, and C3) shown in FIGS. 8B, 9B, and 10B are wound at the same time, and then the third concentrated coils (C1, C4, and C7) shown in FIGS. 8C, 9C, and 10C are wound at the same time. Subsequently, the first distributed coils (C12, C15, and C18) shown in FIGS. 8D, 9D, and 10D are wound at the same time, and then the second distributed coils (C13, C16, and C10) shown in FIGS. 8E, 9E, and 10E are wound at the same time, and finally the third distributed coils (C17, C11, and C14) shown in FIGS. 8F, 9F, and 10F are wound at the same time.

Figure 11:
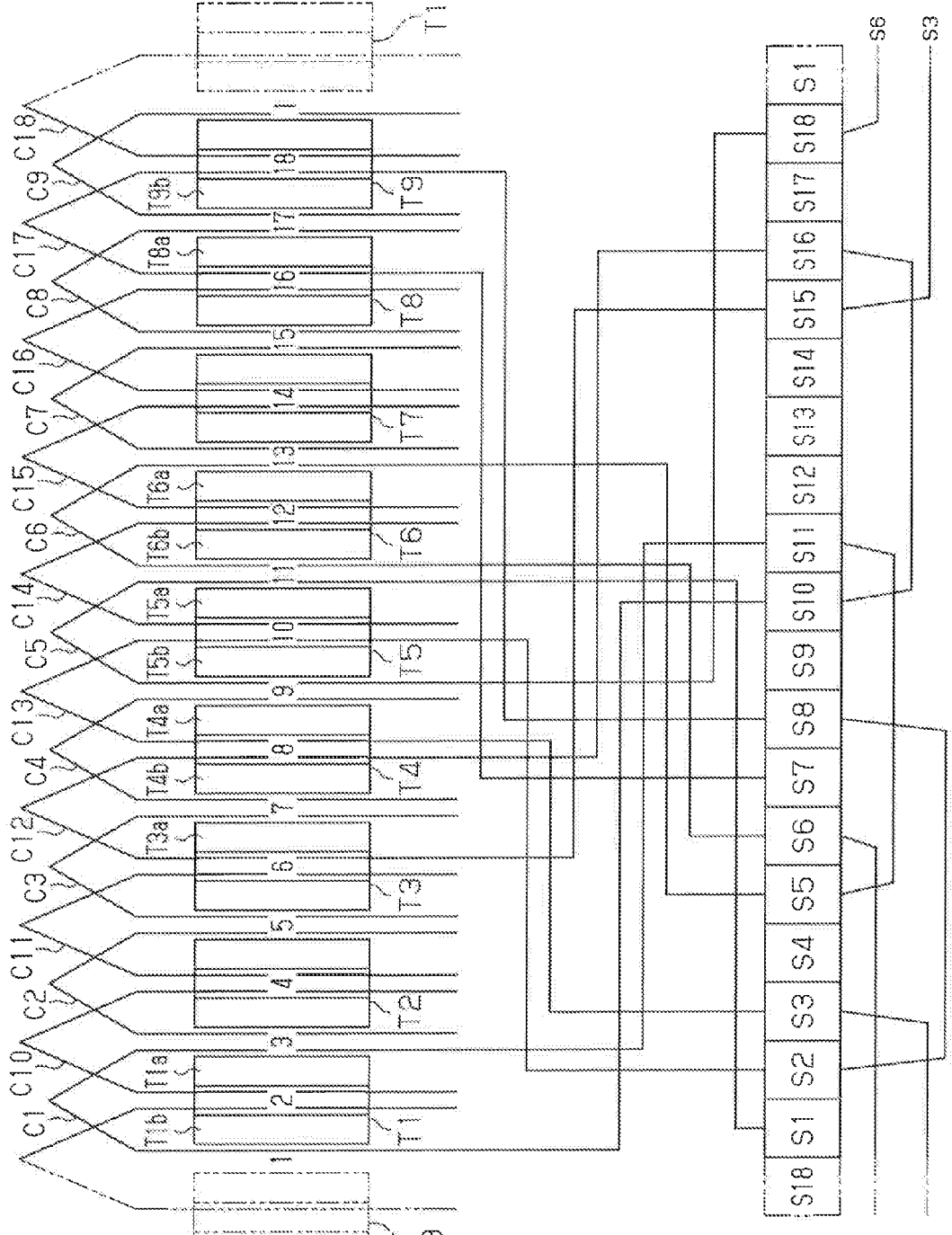
FIG. 11 is a diagram describing connections of armature coils according to the second embodiment.

First, as shown in FIG. 11, an insulator-coated conductive wire for coils, which has its initiating end hooked onto and retained on a riser of the first commutator piece S1, is laid out clockwise to slot number 11, and is wound in a forward direction around an inner winding portion T5c of the fifth tooth T5 between slot numbers 11 and 9. This forms the forward wound fifth coil C5 of the first concentrated coil group GA1 as shown in FIG. 8A.

Figure 12:
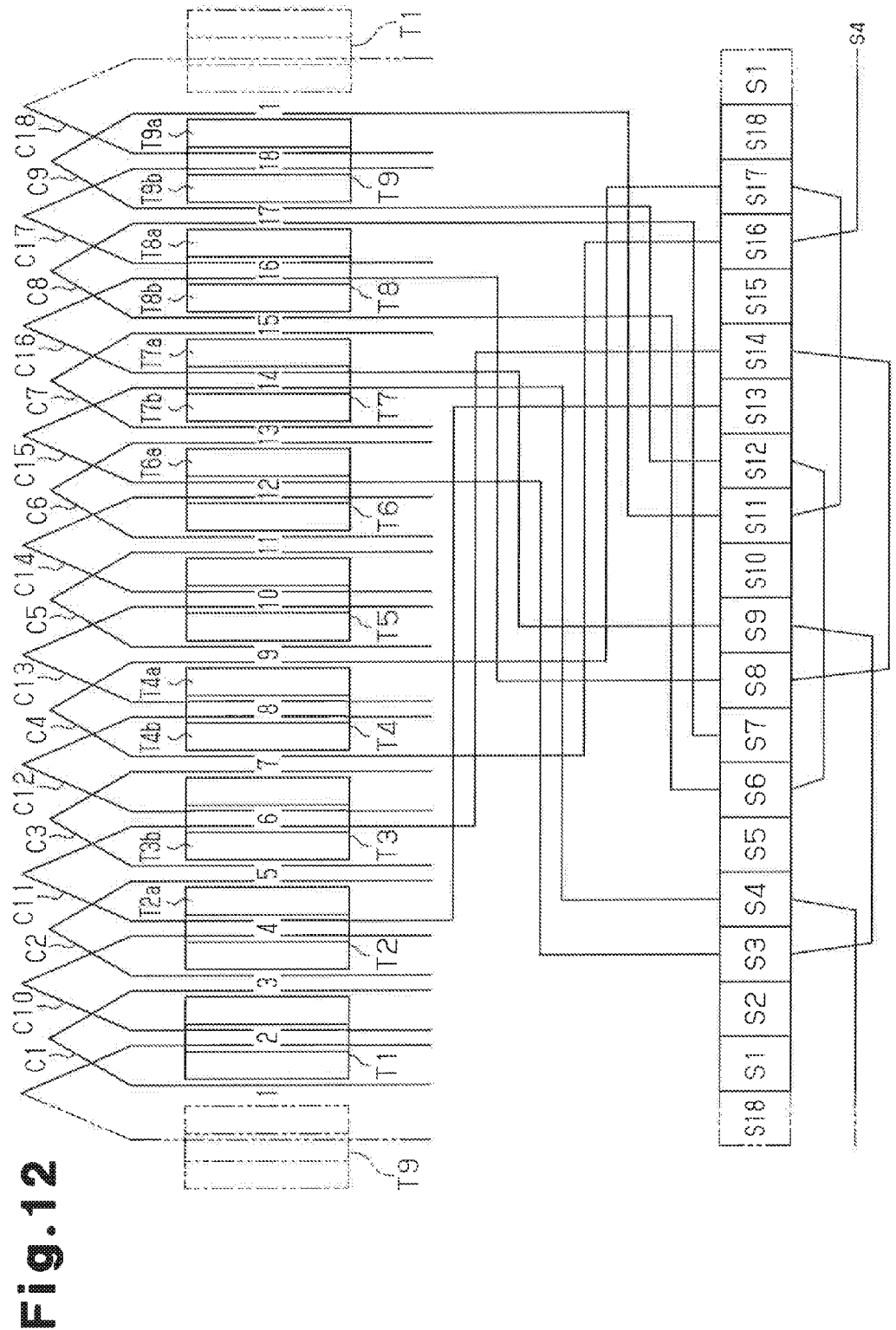
FIG. 12 is a diagram describing connections of armature coils according to the second embodiment.

At the same time, as shown in FIG. 12, an insulator-coated conductive wire for coils, which has its initiating end hooked onto and retained on a riser of the seventh commutator piece S7, is laid out clockwise to slot number 17, and is wound in a forward direction around an inner winding portion T8c of the eighth tooth T8 between slot numbers 17 and 15. This forms the forward wound eighth coil C8 of the second concentrated coil group GA2 as shown in FIG. 9A.

Figure 13:
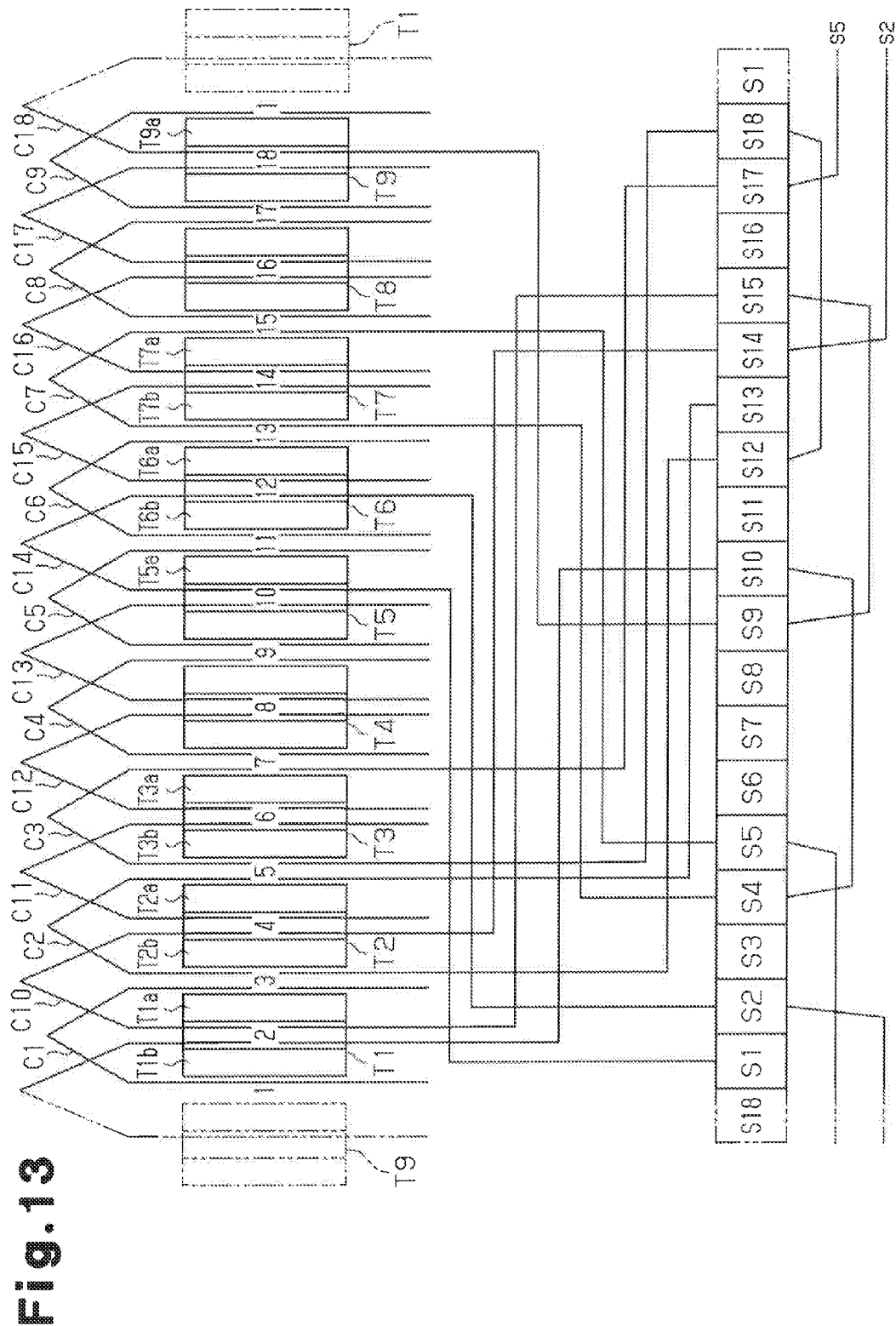
FIG. 13 is a diagram describing connections of armature coils according to the second embodiment.

At the same time, as shown in FIG. 13, an insulator-coated conductive wire for coils, which has its initiating end hooked onto and retained on a riser of the thirteenth commutator piece S13, is laid out clockwise to slot number 5, and is wound in a forward direction around an inner winding portion T2c of the second tooth T2 between slot numbers 5 and 3. This forms the forward wound second coil C2 of the third concentrated coil group GA3 as shown in FIG. 10A.

The conductive wires are laid out from the first commutator piece S1, the seventh commutator piece S7, and the thirteenth commutator piece S13, which are arranged at intervals of 120 degrees, and are wound in a forward direction to form the fifth coil C5, the eighth coil C8, and the second coil C2 at intervals of 120 degrees. This allows the winding procedure to be performed with no interference between the windings performed at the three positions.

After winding the fifth coil C5 of the first concentrated coil group GA1, the conductive wire is laid out clockwise from slot number 9 to the eighteenth commutator piece S18 as shown in FIG. 11, and is hooked onto a riser of the eighteenth commutator piece S18.

The conductive wire hooked onto the riser of the eighteenth commutator piece S18 is laid out clockwise to the sixth commutator piece S6, which is separated clockwise by 120 degrees as shown in FIG. 11, and is hooked onto a riser of the sixth commutator piece S6.

The conductive wire hooked onto the riser of the sixth commutator piece S6 is laid out clockwise to slot number 11 as shown in FIG. 11, and is wound in a reverse direction around an inner winding portion T6c of the sixth tooth T6 between slot numbers 11 and 13. This forms the backward wound sixth coil C6 of the first concentrated coil group GA1 as shown in FIG. 8B.

After winding the eighth coil C8 of the second concentrated coil group GA2, the conductive wire is laid out clockwise from slot number 15 to the sixth commutator piece S6 as shown in FIG. 12, and is hooked onto a riser of the sixth commutator piece S6.

The conductive wire hooked onto the riser of the sixth commutator piece S6 is laid out clockwise to the twelfth commutator piece S12, which is separated clockwise by 120 degrees as shown in FIG. 12, and is hooked onto a riser of the twelfth commutator piece S12.

The conductive wire hooked onto the riser of the twelfth commutator piece S12 is laid out clockwise to slot number 17 as shown in FIG. 12, and is wound in a reverse direction around an inner winding portion T9c of the ninth tooth T9 between slot numbers 17 and 1. This forms the backward wound ninth coil C9 of the second concentrated coil group GA2 as shown in FIG. 9B.

At the same time, after winding the second coil C2 of the third concentrated coil group GA3, the conductive wire is laid out clockwise from slot number 3 to the twelfth commutator piece S12 as shown in FIG. 13, and is hooked onto a riser of the twelfth commutator piece S12.

The conductive wire hooked onto the riser of the twelfth commutator piece S12 is laid out clockwise to the eighteenth commutator piece S18, which is separated clockwise by 120 degrees as shown in FIG. 13, and is hooked onto a riser of the eighteenth commutator piece S18.

The conductive wire hooked onto and retained on the riser of the eighteenth commutator piece S18 is laid out clockwise to slot number 5 as shown in FIG. 13, and is wound in a reverse direction around an inner winding portion T3c of the third tooth T3 between slot numbers 5 and 7. This forms the backward wound third coil C3 of the third concentrated coil group GA3 as shown in FIG. 10B.

The conductive wires are laid out from the eighteenth commutator piece S18, the sixth commutator piece S6, and the twelfth commutator piece S12, which are arranged at intervals of 120 degrees, to the sixth commutator piece S6, the twelfth commutator piece S12, and the eighteenth commutator piece S18, which are arranged at intervals of 120 degrees, to form the sixth coil C6, the ninth coil C9, and the third coil C3 wound in a reverse direction at intervals of 120 degrees. This allows the winding procedure to be performed with no interference between the windings performed at the three positions.

After winding the sixth coil C6 of the first concentrated coil group GA1, the conductive wire is laid out clockwise from slot number 13 to the fifth commutator piece S5 as shown in FIG. 11, and is hooked onto a riser of the fifth commutator piece S5.

The conductive wire hooked onto the riser of the fifth commutator piece S5 is laid out clockwise to the eleventh commutator piece S11, which is separated clockwise by 120 degrees as shown in FIG. 11, and is hooked onto a riser of the eleventh commutator piece S11.

The conductive wire hooked onto the riser of the eleventh commutator piece S11 is laid out clockwise to slot number 3 as shown in FIG. 11, and is wound in a forward direction around an inner winding portion T1c of the first tooth T1 between slot numbers 3 and 1. This forms the forward wound first coil C1 of the first concentrated coil group GA1 as shown in FIG. 8C.

At the same time, after winding the ninth coil C9 of the second concentrated coil group GA2, the conductive wire is laid out clockwise from slot number 1 to the eleventh commutator piece S11, and is hooked onto a riser of the eleventh commutator piece S11 as shown in FIG. 12.

The conductive wire hooked onto the riser of the eleventh commutator piece S11 is laid out clockwise to the seventeenth commutator piece S17, which is separated clockwise by 120 degrees as shown in FIG. 12, and is hooked onto a riser of the seventeenth commutator piece S17.

The conductive wire hooked onto the riser of the seventeenth commutator piece S17 is laid out clockwise to slot number 9 as shown in FIG. 12, and is wound in a forward direction around an inner winding portion T4c of the fourth tooth T4 between slot numbers 9 and 7. This forms the forward wound fourth coil C4 of the second concentrated coil group GA2 as shown in FIG. 9C.

At the same time, after winding the third coil C3 of the third concentrated coil group GA3, the conductive wire is laid out clockwise from slot number 7 to the seventeenth commutator piece S17 as shown in FIG. 13, and is hooked onto a riser of the seventeenth commutator piece S17.

The conductive wire hooked onto the riser of the seventeenth commutator piece S17 is laid out clockwise to the fifth commutator piece S5, which is separated clockwise by 120 degrees as shown in FIG. 13, and is hooked onto a riser of the fifth commutator piece S5.

The conductive wire hooked onto the riser of the fifth commutator piece S5 is laid out clockwise to slot number 15 as shown in FIG. 13, and is wound in a forward direction around an inner winding portion T7c of the seventh tooth T7 between slot numbers 15 and 13. This forms the forward wound seventh coil C7 of the third concentrated coil group GA3 as shown in FIG. 10C.

The conductive wires are laid out from the fifth commutator piece S5, the eleventh commutator piece S11, and the seventeenth commutator piece S17, which are arranged at intervals of 120 degrees, to the eleventh commutator piece S11, the seventeenth commutator piece S17, and the fifth commutator piece S5, which are arranged at intervals of 120 degrees, to form the first coil C1, the fourth coil C4, and the seventh coil C7 wound in a forward direction at intervals of 120 degrees. This allows the winding procedure to be performed with no interference between the windings performed at the three positions.

Figure 14A:
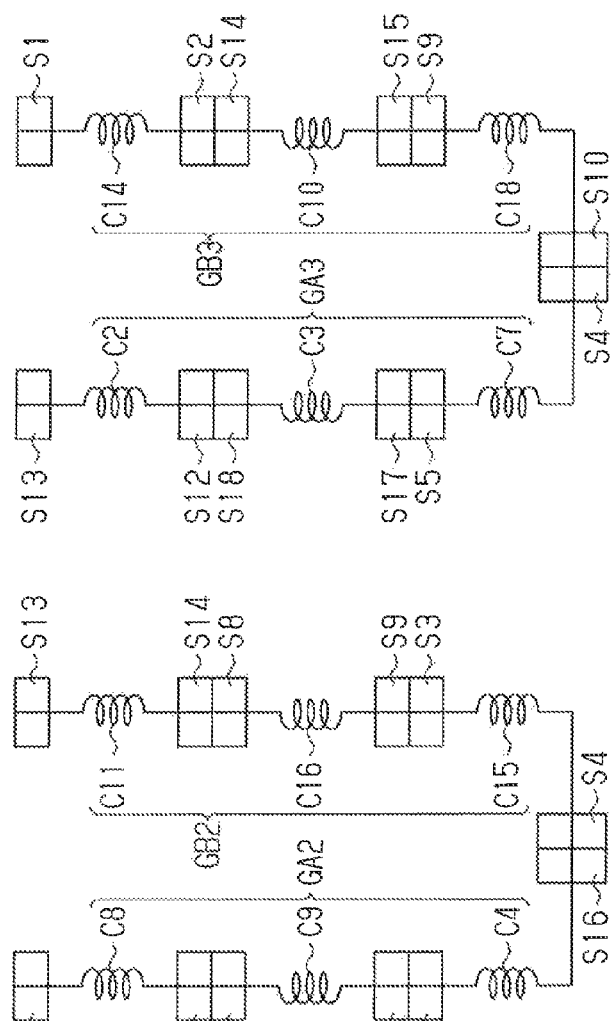
FIGS. 14A to 14C are equivalent circuit diagrams of armature coils according to the second embodiment.
Figure 14B:
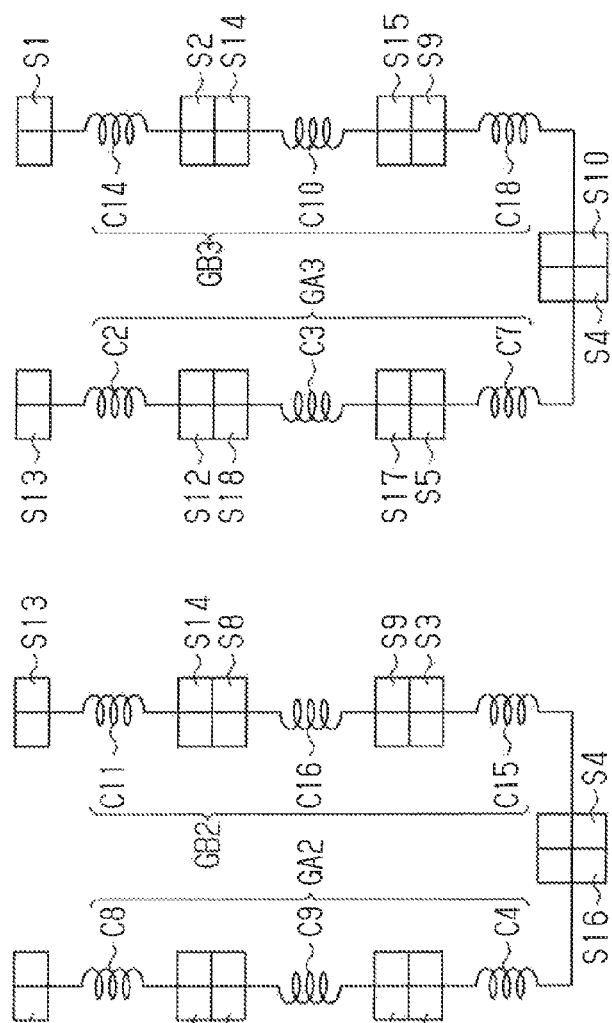
Figure 14C:
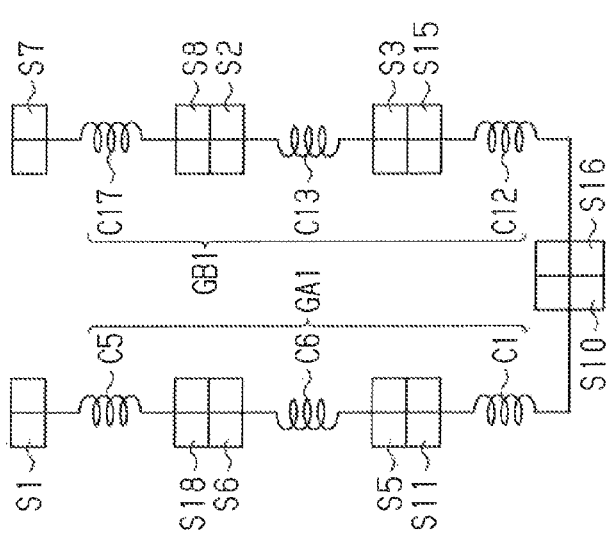

As shown in FIGS. 14A to 14C, the above procedure completes all the first to ninth coils C1 to C9 of the first to third concentrated coil groups GA1 to GA3.

After winding the first coil C1 of the first concentrated coil group GA1, the conductive wire is laid out clockwise from slot number 1 to the tenth commutator piece S10 as shown in FIG. 11, and is hooked onto a riser of the tenth commutator piece S10.

The conductive wire hooked onto the riser of the tenth commutator piece S10 is laid out clockwise to the sixteenth commutator piece S16, which is separated clockwise by 120 degrees as shown in FIG. 11, and is hooked onto a riser of the sixteenth commutator piece S16.

The conductive wire hooked onto the riser of the sixteenth commutator piece S16 is laid out clockwise to slot number 15 as shown in FIG. 11, and is wound in a forward direction around an outer winding portion including the second branch portion T4b of the fourth tooth T4 and the first branch portion T1a of the third tooth T3 between slot numbers 8 and 6. This forms the forward wound twelfth coil C12 of the first distributed coil group GB1 as shown in FIG. 8D.

The twelfth coil C12 is separated clockwise by 100 degrees from the first coil C1 and is separated counterclockwise by 60 degrees from the fifth coil C5.

At the same time, after winding the fourth coil C4 of the second concentrated coil group GA2, the conductive wire is laid out clockwise from slot number 7 to the sixteenth commutator piece S16 as shown in FIG. 12, and is hooked onto a riser of the sixteenth commutator piece S16.

The conductive wire hooked onto the riser of the sixteenth commutator piece S16 is laid out clockwise to the fourth commutator piece S4, which is separated clockwise by 120 degrees as shown in FIG. 12, and is hooked onto a riser of the fourth commutator piece S4.

The conductive wire hooked onto the riser of the fourth commutator piece S4 is laid out clockwise to slot number 14 as shown in FIG. 12, and is wound in a forward direction around an outer winding portion including the second branch portion T7b of the seventh tooth T7 and the first branch portion T6a of the sixth tooth T6 between slot numbers 14 and 12. This forms the forward wound fifteenth coil C15 of the second distributed coil group GB2 as shown in FIG. 9D.

The fifteenth coil C15 is separated clockwise by 100 degrees from the fourth coil C4 and is separated counterclockwise by 60 degrees from the eighth coil C8.

In the same manner, after winding the seventh coil C7 of the third concentrated coil group GA3, the conductive wire is laid out clockwise from slot number 13 to the fourth commutator piece S4 as shown in FIG. 13, and is hooked onto a riser of the fourth commutator piece S4.

The conductive wire hooked onto the riser of the fourth commutator piece S4 is laid out clockwise to the tenth commutator piece S10, which is separated clockwise by 120 degrees as shown in FIG. 13, and is hooked onto a riser of the tenth commutator piece S10.

The conductive wire hooked onto the riser of the tenth commutator piece S10 is laid out clockwise to slot number 2 as shown in FIG. 13, and is wound in a forward direction around an outer winding portion including the second branch portion T1b of the first tooth T1 and the first branch portion T9a of the ninth tooth T9 between slot numbers 2 and 18. This forms the forward wound eighteenth coil C18 of the third distributed coil group GB3 as shown in FIG. 10D.

The eighteenth coil C18 is separated clockwise by 100 degrees from the seventh coil C7 and is separated counterclockwise by 60 degrees from the second coil C2.

The conductive wires are laid out from the tenth commutator piece S10, the sixteenth commutator piece S16, and the fourth commutator piece S4, which are arranged at intervals of 120 degrees, to the sixteenth commutator piece S16, the fourth commutator piece S4, and the tenth commutator piece S10, which are arranged at intervals of 120 degrees, to form the twelfth coil C12, the fifteenth coil C15, and the eighteenth coil C18 wound in a forward direction at intervals of 120 degrees. This allows the winding procedure to be performed with no interference between the windings performed at the three positions.

After winding the twelfth coil C12 of the first distributed coil group GB1, the conductive wire is laid out clockwise from slot number 6 to the fifteenth commutator piece S15 as shown in FIG. 11, and is hooked onto a riser of the fifteenth commutator piece S15.

The conductive wire hooked onto the riser of the fifteenth commutator piece S15 is laid out clockwise to the third commutator piece S3, which is separated clockwise by 120 degrees as shown in FIG. 11, and is hooked onto a riser of the third commutator piece S3.

The conductive wire hooked onto the riser of the third commutator piece S3 is laid out clockwise to slot number 8 as shown in FIG. 11, and is wound in a reverse direction around an outer winding portion including the first branch portion T4a of the fourth tooth T4 and the second branch portion T5b of the fifth tooth T5 between slot numbers 8 and 10. This forms the backward wound thirteenth coil C13 of the first distributed coil group GB1 as shown in FIG. 8E.

At the same time, after winding the fifteenth coil C15 of the second distributed coil group GB2, the conductive wire is laid out clockwise from slot number 12 to the third commutator piece S3 as shown in FIG. 12, and is hooked onto a riser of the third commutator piece S3.

The conductive wire hooked onto the riser of the third commutator piece S3 is laid out clockwise to the ninth commutator piece S9, which is separated clockwise by 120 degrees as shown in FIG. 12, and is hooked onto a riser of the ninth commutator piece S9.

The conductive wire hooked onto the riser of the ninth commutator piece S9 is laid out clockwise to slot number 14 as shown in FIG. 12, and is wound in a reverse direction around an outer winding portion including the first branch portion T7a of the seventh tooth T7 and the second branch portion T8b of the eighth tooth T8 between slot numbers 14 and 16. This forms the backward wound sixteenth coil C16 of the second distributed coil group GB2 as shown in FIG. 9E.

At the same time, after winding the eighteenth coil C18 of the third distributed coil group GB3, the conductive wire is laid out clockwise from slot number 18 to the ninth commutator piece S9 as shown in FIG. 13, and is hooked onto a riser of the ninth commutator piece S9.

The conductive wire hooked onto the riser of the ninth commutator piece S9 is laid out clockwise to the fifteenth commutator piece S15, which is separated clockwise by 120 degrees as shown in FIG. 13, and is hooked onto a riser of the fifteenth commutator piece S15.

The conductive wire hooked onto the riser of the fifteenth commutator piece S15 is laid out clockwise to slot number 2 as shown in FIG. 13, and is wound in a reverse direction around an outer winding portion including the first branch portion T1a of the first tooth T1 and the second branch portion T2b of the second tooth T2 between slot numbers 2 and 4. This forms the backward wound tenth coil C10 of the third distributed coil group GB3 as shown in FIG. 10E.

The conductive wires are laid out from the fifteenth commutator piece S15, the third commutator piece S3, and the ninth commutator piece S9, which are arranged at intervals of 120 degrees, to the third commutator piece S3, the ninth commutator piece S9, and the fifteenth commutator piece S15, which are arranged at intervals of 120 degrees, to form the thirteenth coil C13, the sixteenth coil C16, and the tenth coil C10 wound in a reverse direction at intervals of 120 degrees. This allows the winding procedure to be performed with no interference between the windings performed at the three positions.

After winding the thirteenth coil C13 of the first distributed coil group GB1, the conductive wire is laid out clockwise from slot number 10 to the second commutator piece S2 as shown in FIG. 11, and is hooked onto a riser of the second commutator piece S2.

The conductive wire hooked onto the riser of the second commutator piece S2 is laid out clockwise to the eighth commutator piece S8, which is separated clockwise by 120 degrees as shown in FIG. 11, and is hooked onto a riser of the eighth commutator piece S8.

The conductive wire hooked onto the riser of the eighth commutator piece S8 is laid out clockwise to slot number 18 as shown in FIG. 11, and is wound in a forward direction around an outer winding portion including the second branch portion T9b of the ninth tooth T9 and the first branch portion T8a of the eighth tooth T8 between slot numbers 18 and 16. This forms the forward wound seventeenth coil C17 of the first distributed coil group GB1 as shown FIG. 8F.

At the same time, after winding the sixteenth coil C16 of the second distributed coil group GB2, the conductive wire is laid out clockwise from slot number 16 to the eighth commutator piece S8 as shown in FIG. 12, and is hooked onto a riser of the eighth commutator piece S8.

The conductive wire hooked onto the riser of the eighth commutator piece S8 is laid out clockwise to the fourteenth commutator piece S14, which is separated clockwise by 120 degrees as shown in FIG. 12, and is hooked onto a riser of the fourteenth commutator piece S14.

The conductive wire hooked onto and retained on the riser of the fourteenth commutator piece S14 is laid out clockwise to slot number 6 as shown in FIG. 12, and is wound in a forward direction around an outer winding portion including the second branch portion T3b of the third tooth T3 and the first branch portion T2a of the second tooth T2 between slot numbers 6 and 4. This forms the forward wound eleventh coil C11 of the second distributed coil group GB2 as shown in FIG. 9F.

At the same time, after winding the tenth coil C10 of the third distributed coil group GB3, the conductive wire is laid out clockwise from slot number 4 to the fourteenth commutator piece S14 as shown in FIG. 13, and is hooked onto a riser of the fourteenth commutator piece S14.

The conductive wire hooked onto the riser of the fourteenth commutator piece S14 is laid out clockwise to the second commutator piece S2, which is separated clockwise by 120 degrees as shown in FIG. 13, and is hooked onto a riser of the second commutator piece S2.

The conductive wire hooked onto the riser of the second commutator piece S2 is laid out clockwise to slot number 12 as shown in FIG. 13, and is wound in a forward direction around an outer winding portion including the second branch portion T6b of the sixth tooth T6 and the first branch portion T5a of the fifth tooth T5 between slot numbers 12 and 10. This forms the forward wound fourteenth coil C14 of the third distributed coil group GB3 as shown in FIG. 10F.

The conductive wires are laid out from the second commutator piece S2, the eighth commutator piece S8, and the fourteenth commutator piece S14, which are arranged at intervals of 120 degrees, to the eighth commutator piece S8, the fourteenth commutator piece S14, and the second commutator piece S2, which are arranged at intervals of 120 degrees, to form the seventeenth coil C17, the eleventh coil C11, and the fourteenth coil C14 wound in a forward direction at intervals of 120 degrees. This allows the winding procedure to be performed with no interference between the windings performed at the three positions.

After winding the seventeenth coil C17 of the first distributed coil group GB1, the conductive wire is laid out clockwise from slot number 16 to the seventh commutator piece S7 as shown in FIG. 11, and is hooked onto a riser of the seventh commutator piece S7. More specifically, the coils of the first concentrated coil group GA1 and the coils of the first distributed coil group GB1 are sequentially wound continuously from a single conductive wire as shown in FIGS. 11 and 14A.

After winding the eleventh coil C11 of the second distributed coil group GB2, the conductive wire is laid out clockwise from slot number 4 to the thirteenth commutator piece S13 as shown in FIG. 12, and is hooked onto a riser of the thirteenth commutator piece S13. More specifically, the coils of the second concentrated coil group GA2 and the coils of the second distributed coil group GB2 are sequentially wound continuously from a single conductive wire as shown in FIGS. 12 and 14B.

When winding the fourteenth coil C14 of the third distributed coil group GB3, the conductive wire is laid out clockwise from slot number 10 to the first commutator piece S1 as shown in FIG. 13, and is hooked onto a riser of the first commutator piece S1. More specifically, the coils of the third concentrated coil group GA3 and the coils of the third distributed coil group GB3 are sequentially wound continuously from a single conductive wire as shown in FIGS. 13 and 14C.

The conductive wires are laid out to and hooked onto the seventh commutator piece 7, the thirteenth commutator piece S13, and the first commutator piece S1, which are arranged at intervals of 120 degrees. This allows the final winding procedure to be performed with no interference between the windings performed at the different positions.

The conductive wires are hooked onto and retained on the risers of the seventh commutator piece S7, the thirteenth commutator piece S13, and the first commutator piece S1. This completes the winding procedure initiated from the three positions at the same time for winding the first to eighteenth coils C1 to C18.

The above embodiment has the advantages described below.

In the above embodiment, among the concentrated first to ninth coils C1 to C9, three coils, that is, the fifth coil C5, the sixth coil C6, and the first coil C1, are assigned to the first concentrated coil group GA1. The eighth coil C8, the ninth coil C9, and the seventh coil C7, which are the three coils 120 degrees apart from the three coils of the first concentrated coil group GA1, are assigned to the second concentrated coil group GA2. The second coil C2, the third coil C3, and the fourth coil C4, which are the three coils 120 degrees apart from the three coils of the second concentrated coil group GA2, are assigned to the third concentrated coil group GA3.

In the same manner, among the distributed tenth to eighteenth coils C10 to C18, three coils, or the twelfth coil C12, the thirteenth coil C13, and the seventeenth coil C17, are assigned to the first distributed coil group GB1. The fifteenth coil C15, the sixteenth coil C16, and the eleventh coil C11, which are the three coils 120 degrees apart from the three coils of the first distributed coil group GB1, are assigned to the second distributed coil group GB2. The eighteenth coil C18, the tenth coil C10, and the fourteenth coil C14, which are the three coils 120 degrees apart from the three coils of the second distributed coil group GB2, are assigned to the third distributed coil group GB3.

In the first concentrated coil group GA1, the second concentrated coil group GA2, and the third concentrated coil group GA3, the first concentrated coils (C5, C8, and C2) are first wound at the same time, and the second concentrated coils (C6, C9, and C3) are wound at the same time, and then the third concentrated coils (C1, C4, and C7) are sequentially wound at the same time. After winding the coils of the first concentrated coil group GA1, the second concentrated coil group GA2, and the third concentrated coil group GA3, the coils of the first distributed coil group GB1 corresponding to the first concentrated coil group GA1 are wound at the same time, the coils of the second distributed coil group GB2 corresponding to the second concentrated coil group GA2 are wound at the same time, and the coils of the third distributed coil group GB3 corresponding to the third concentrated coil group GA3 are wound at the same time. In other words, in the first to third distributed coil groups (GB1 to GB3), the first distributed coils (C12, C15, and C18) are first wound at the same time, and then the second distributed coils (C13, C16, and C10) are wound at the same time, and finally the third distributed coils (C17, C11, and C14) are wound at the same time.

The coils assigned to the different groups are wound at the respective three positions at the same time by using three conductive wires, each of which is wound continuously. This forms all the eighteen coils.

Winding the three conductive wires at the three positions at the same time shortens the time taken for the winding procedure.

In the present embodiment, the coils of the first concentrated coil group GA1, the coils of the second concentrated coil group GA2, and the coils of the third concentrated coil group GA3 are wound sequentially at the same time.

More specifically, the coils of the first concentrated coil group GA1 are wound in the order shown in FIGS. 8A, 8B, and 8C, the coils of the second concentrated coil group GA2 are wound in the order shown in FIGS. 9A, 9B, and 9C, and the coils of the third concentrated coil group GA3 are wound in the order shown in FIGS. 10A, 10B, and 10C.

In detail, the coils of the first concentrated coil group GA1 are wound in the order of the forward wound fifth coil C5, the backward wound sixth coil C6, which is adjacent clockwise to the coil C5, and the forward wound first coil C1, which is separated clockwise by 160 degrees from the coil C6.

The coils of the second concentrated coil group GA2 are wound in the order of the forward wound eighth coil C8, the backward wound ninth coil C9, which is adjacent clockwise to the coil C8, and the forward wound fourth coil C4, which is separated clockwise by 160 degrees from the coil C9.

The coils of the third concentrated coil group GA3 are wound in the order of the forward wound second coil C2, the backward wound third coil C3, which is adjacent clockwise to the coil C2, and the forward wound seventh coil C7, which is separated clockwise by 160 degrees from the coil C3.

The order in which the coils of each concentrated coil group are wound is a mere example, and the coils may be wound in any order in which the coils at the same potential positions are wound sequentially.

In the present embodiment, after winding the coils of the first concentrated coil group GA1, the coils of the second concentrated coil group GA2, and the coils of the third concentrated coil group GA3, the coils of the first distributed coil group GB1, the coils of the second distributed coil group GB2, and the coils of the third distributed coil group GB3 are wound sequentially at the same time.

More specifically, the coils of the first distributed coil group GB1 are wound in the order shown in FIGS. 8D, 8E, and 8F, the coils of the second distributed coil group GB2 are wound in the order shown in FIGS. 9D, 9E, and 9F, and the coils of the third distributed coil group GB3 are wound in the order shown in FIGS. 10D, 10E, and 10F.

In detail, the coils of the first distributed coil group GB1 are wound in the order of the forward wound twelfth coil C12, the backward wound thirteenth coil C13, which is adjacent clockwise to the coil C12, and the forward wound first coil C17, which is separated clockwise by 160 degrees from the coil C13.

The coils of the second distributed coil group GB2 are wound in the order of the forward wound fifteenth coil C15, the backward wound sixteenth coil C16, which is adjacent clockwise to the coil C15, and the forward wound eleventh coil C11, which is separated clockwise by 160 degrees from the coil C16.

The coils of the third distributed coil group GB3 are wound in the order of the forward wound eighteenth coil C18, the backward wound tenth coil C10, which is adjacent clockwise to the coil C18, and the forward wound fourteenth coil C14, which is separated clockwise by 160 degrees from the coil C10.

The order in which the coils of each distributed coil group are wound is a mere example, and the coils may be wound in any order in which the coils at the same potential positions are wound sequentially.

Although the method for winding coils is used for the armature 3 with nine teeth T, that is, the first to ninth teeth T1 to T9 in the present embodiment, the method is applicable to an armature with a number of teeth T other than nine.

The invention claimed is:

1. An armature comprising:
    an armature core including 3n teeth, wherein "n" is an odd number greater than or equal to 3, and arranged in a circumferential direction, wherein each of the 3n teeth includes an inner winding portion, which extends radially in a proximal region of each of the corresponding tooth, and first and second branch portions, which extend radially and branch off in a bifurcated manner from a distal end of the inner winding portion in the circumferential direction;
    6n armature coils including 3n concentrated coils and 3n distributed coils, wherein the 3n concentrated coils are respectively wound around the inner winding portions of the teeth, the 3n distributed coils are respectively wound around outer winding portions of adjacent ones of the teeth, and each of the outer winding portions includes the first branch portion of one of the adjacent teeth and the second branch portion of the other one of the adjacent teeth; and
    a commutator including 6n commutator pieces arranged in the circumferential direction, wherein the commutator is integrally rotatable with the armature core, wherein
    the 3n concentrated coils include
        a first concentrated coil group including n first concentrated coils that are arranged at angular intervals of 360/n degrees and wound in a forward direction,
        a second concentrated coil group including n second concentrated coils that are respectively arranged adjacent to the first concentrated coils at angular intervals of 360/n degrees and wound in a reverse direction, and
        a third concentrated coil group including n third concentrated coils that are arranged between one of the first concentrated coils and one of the second concentrated coils at angular intervals of 360/n degrees and wound in a forward direction,
    the 3n distributed coils include
        a first distributed coil group including n first distributed coils that are arranged at angular intervals of 360/n degrees and wound in a forward direction,
        a second distributed coil group including n second distributed coils that are respectively arranged adjacent to the first distributed coils at angular intervals of 360/n degrees and wound in a reverse direction, and
        a third distributed coil group including n third distributed coils arranged between one of the first distributed coils and one of the second distributed coils at angular intervals of 360/n degrees and wound in a forward direction,
    each of the second distributed coils is arranged between adjacent ones of the first concentrated coils and the third concentrated coils in the circumferential direction, and
    the first to third concentrated coil groups are sequentially connected, and the first to third distributed coil groups are sequentially connected,
    an initiating end of the first distributed coil group is connected to a terminating end of the third concentrated coil group, and a terminating end of the third distributed coil group is connected to an initiating end of the first concentrated coil group,
    each of the coil groups is connected to another one of the coil groups by a group of n commutator pieces arranged at equal angular intervals of 360/n, and the n commutator pieces of each group are respectively adjacent to n commutator pieces of another group used to connect the subsequent coil groups.

2. The armature according to claim 1, wherein n is 3.

3. An armature comprising:
an armature core including 3n teeth, wherein "n" is an odd number greater than or equal to 3, and arranged in a circumferential direction, wherein each of the 3n teeth includes an inner winding portion, which extends radially in a proximal region of the corresponding tooth, and first and second branch portions, which extend radially and branch off in a bifurcated manner from a distal end of the inner winding portion in the circumferential direction;
6n armature coils including 3n concentrated coils and 3n distributed coils, wherein the 3n concentrated coils are respectively wound around the inner winding portions of the teeth, the 3n distributed coils are respectively wound around outer winding portions of adjacent ones of the teeth, and each of the outer winding portions includes the first branch portion of one of the adjacent teeth and the second branch portion of the other one of the adjacent teeth; and
a commutator including 6n commutator pieces arranged in the circumferential direction, wherein the commutator is integrally rotatable with the armature core, wherein
the 3n concentrated coils are in n groups of three concentrated coils that include first to nth concentrated coil groups sequentially connecting a first concentrated coil wound in a forward direction, a second concentrated coil wound in a reverse direction, and a third concentrated coil wound in a forward direction,
adjacent ones of the first to nth concentrated coil groups are connected separated from each other by 360/n degrees, and the first to nth concentrated coil groups are electrically connected in parallel,
the 3n distributed coils are in n groups of three distributed coils that include first to nth distributed coil groups each sequentially connecting a first distributed coil wound in a forward direction, a second distributed coil wound in a reverse direction, and a third distributed coil wound in a forward direction,
adjacent ones of the first to nth distributed coil groups are connected separated from each other by 360/n degrees, and the first to nth distributed coil groups are electrically connected in parallel,
an initiating end of each of the first to nth distributed coils is connected to a terminating end of the corresponding one of the first to nth concentrated coil groups, and
each coil is connected to another one of the coils by two commutator pieces arranged at angular intervals of 360/n degrees.

4. The armature according to claim 3, wherein n is 3.

5. A direct current motor comprising:
the armature according to claim 1;
a plurality of magnetic poles arranged in a circumferential direction, wherein the magnetic poles radially face distal ends of the teeth; and
a plurality of power feeding brushes that are pressed and come in contact with the commutator pieces.

6. A direct current motor comprising:
the armature according to claim 3;
a plurality of magnetic poles arranged in a circumferential direction, wherein the magnetic poles radially face distal ends of the teeth; and
a plurality of power feeding brushes that are pressed and come in contact with the commutator pieces.

* * * * *